(12) United States Patent
Raju et al.

(10) Patent No.: US 7,552,233 B2
(45) Date of Patent: Jun. 23, 2009

(54) SYSTEM AND METHOD FOR INFORMATION OBJECT ROUTING IN COMPUTER NETWORKS

(75) Inventors: Jyoti Raju, San Jose, CA (US); J. J. Garcia-Luna-Aceves, San Mateo, CA (US); Bradley R. Smith, Santa Cruz, CA (US)

(73) Assignee: Adara Networks, Inc., San Jose, CA (US)

(*) Notice: Subject to any disclaimer, the term of this patent is extended or adjusted under 35 U.S.C. 154(b) by 757 days.

(21) Appl. No.: 10/241,767

(22) Filed: Sep. 10, 2002

(65) Prior Publication Data

US 2003/0200307 A1    Oct. 23, 2003

Related U.S. Application Data

(63) Continuation-in-part of application No. 09/810,148, filed on Mar. 15, 2001, now Pat. No. 7,162,539.

(60) Provisional application No. 60/323,126, filed on Sep. 10, 2001, provisional application No. 60/322,899, filed on Sep. 10, 2001, provisional application No. 60/190,331, filed on Mar. 16, 2000, provisional application No. 60/200,401, filed on Apr. 28, 2000.

(51) Int. Cl.
G06F 15/173    (2006.01)

(52) U.S. Cl. ................................ 709/238; 709/242

(58) Field of Classification Search ......... 709/227–229, 709/230–237, 223–226, 217–219, 221, 228, 709/238–244

See application file for complete search history.

(56) References Cited

U.S. PATENT DOCUMENTS

| | | | |
|---|---|---|---|
| 5,088,032 A | 2/1992 | Bosack | |
| 5,115,495 A | 5/1992 | Tsuchiya et al. | |
| 5,774,668 A | 6/1998 | Choquier et al. | |
| 5,822,320 A | 10/1998 | Horikawa et al. | |
| 6,003,030 A | 12/1999 | Kenner et al. | |

(Continued)

FOREIGN PATENT DOCUMENTS

| | | |
|---|---|---|
| EP | 0 817 444 A2 | 1/1998 |
| EP | 0 959 601 | 11/1999 |
| EP | 0 817 444 A3 | 12/2000 |
| WO | WO 98/57275 | 12/1998 |
| WO | WO 99/40514 | 8/1999 |
| WO | WO 01/18641 A1 | 3/2001 |

OTHER PUBLICATIONS

Y. Rekhter and T. Li, A border gateway protocol 4 (BGP-4). RFC 1771. Mar. 1995.*

(Continued)

*Primary Examiner*—Ario Etienne
*Assistant Examiner*—Brendan Y Higa
(74) *Attorney, Agent, or Firm*—Blakely, Sokoloff, Taylor & Zafman LLP

(57) ABSTRACT

An address of a server that should supply an information object or service to a requester is returned in response to a request therefor. The address of the server that is returned is an optimal server selected according to specified performance metrics. The specified performance metrics may include one or more of an average delay from the server to another, average processing delays at the server, reliability of a path from the server to another, available bandwidth in said path, and loads on the server.

28 Claims, 4 Drawing Sheets

U.S. PATENT DOCUMENTS

| | | | |
|---|---|---|---|
| 6,006,264 A * | 12/1999 | Colby et al. ............... | 709/226 |
| 6,012,067 A | 1/2000 | Sarkar | |
| 6,012,068 A | 1/2000 | Boezeman et al. | |
| 6,052,718 A | 4/2000 | Gifford | |
| 6,092,178 A | 7/2000 | Jindal et al. | |
| 6,097,718 A | 8/2000 | Bion | |
| 6,108,703 A | 8/2000 | Leighton et al. | |
| 6,115,742 A * | 9/2000 | Franklin et al. ............ | 709/224 |
| 6,115,752 A | 9/2000 | Chauhan | |
| 6,130,881 A | 10/2000 | Stiller et al. | |
| 6,138,162 A | 10/2000 | Pistriottio et al. | |
| 6,154,777 A | 11/2000 | Ebrahim | |
| 6,175,869 B1 * | 1/2001 | Ahuja et al. ............... | 709/226 |
| 6,182,224 B1 | 1/2001 | Phillips et al. | |
| 6,185,619 B1 * | 2/2001 | Joffe et al. .................. | 709/229 |
| 6,201,794 B1 | 3/2001 | Stewart et al. | |
| 6,205,477 B1 | 3/2001 | Johnson et al. | |
| 6,205,481 B1 | 3/2001 | Heddaya et al. | |
| 6,249,801 B1 | 6/2001 | Zisapel et al. | |
| 6,256,675 B1 | 7/2001 | Rabinovich | |
| 6,266,706 B1 | 7/2001 | Brodnik et al. | |
| 6,298,381 B1 * | 10/2001 | Shah et al. .................. | 709/228 |
| 6,304,913 B1 | 10/2001 | Rune | |
| 6,314,088 B1 | 11/2001 | Yamano | |
| 6,314,465 B1 | 11/2001 | Paul et al. | |
| 6,317,778 B1 | 11/2001 | Dias et al. | |
| 6,327,252 B1 | 12/2001 | Silton et al. | |
| 6,327,622 B1 * | 12/2001 | Jindal et al. ................ | 709/228 |
| 6,377,551 B1 | 4/2002 | Luo et al. | |
| 6,397,246 B1 | 5/2002 | Wolfe | |
| 6,405,252 B1 | 6/2002 | Gupta et al. | |
| 6,415,323 B1 * | 7/2002 | McCanne et al. ........... | 709/225 |
| 6,438,652 B1 | 8/2002 | Jordan et al. | |
| 6,449,647 B1 | 9/2002 | Colby et al. | |
| 6,553,376 B1 | 4/2003 | Lewis et al. | |
| 6,574,663 B1 * | 6/2003 | Bakshi et al. ............... | 709/223 |
| 6,578,066 B1 | 6/2003 | Logan et al. | |
| 6,601,098 B1 | 7/2003 | Case et al. | |
| 6,687,731 B1 | 2/2004 | Kavak | |
| 6,785,704 B1 | 8/2004 | McCanne | |
| 6,917,985 B2 | 7/2005 | Madruga et al. | |
| 6,965,938 B1 | 11/2005 | Beasley et al. | |
| 7,020,083 B2 | 3/2006 | Garcia-Luna-Aceves et al. | |
| 7,162,539 B2 | 1/2007 | Garcia-Luna-Aceves | |
| 7,200,111 B2 | 4/2007 | Garcia-Luna-Aceves et al. | |
| 2001/0056416 A1 | 12/2001 | Garcia-Luna-Aceves | |
| 2002/0004846 A1 | 1/2002 | Garcia-Luna-Aceves et al. | |
| 2002/0007413 A1 | 1/2002 | Garcia-Luna-Aceves et al. | |
| 2002/0010737 A1 | 1/2002 | Garcia-Luna-Aceves et al. | |
| 2002/0016860 A1 | 2/2002 | Garcia-Luna-Aceves et al. | |
| 2002/0026511 A1 | 2/2002 | Garcia-Luna-Aceves et al. | |
| 2002/0133537 A1 * | 9/2002 | Lau et al. .................... | 709/203 |
| 2003/0101278 A1 | 5/2003 | Garcia-Luna-Aceves et al. | |

OTHER PUBLICATIONS

PCT International Search Report, PCT/US02/28961, mailed Dec. 10, 2002, 4 Pages.

T. Berners-Lee, "Information Management: A Proposal," CERN Document, (Mar. 1989, May 1990).

Ari Luotonen, Henrik Frystyk Nielsen, and Tim Berbers-Lee. Cern httpd. http://www.w3.org/Daemon, Jul. 1996.

W.W. Chu, "Optimal File Allocation in a Multiple Computer System," IEEE Transactions on Computers, Oct. 1969.

S. Mahmoud and J.S. Riordon, "Optimal Allocation of Resources in Distributed Information Networks," ACM Transactions on Data Base Systems, vol. 1, No. 1, pp. 60-7S (Mar. 1976).

H.L. Morgan and K.D. Levin, "Optimal Program and Data Locations in Computer Networks," Communications of the ACM, vol. 20, No. 5, May 1977.

W.W. Chu, "Performance of File Directory Systems for Data Bases in Star and Distributed Networks," Proc. National Computer Conference, 1976, pp. 577-587.

D. Small and W.W. Chu, "A Distributed Data Base Architecture for Data Processing in a Dynamic Environment," Proc. COMPCON 79 Spring.

G. Chiu, C.S. Rahgavendra, and S.M. Ng, "Resource Allocation with Load Balancing Consideration in Distributed Computing Systems," Proc. IEEE Infocom 89, Ottawa, Ontario, Canada, Apr. 1989, pp. 758-765.

J.D. Guyton and M.F. Schwartz, "Locating Nearby Copies of Replicated Internet Servers," Technical Report CU-CS-762-95, Department of Computer Science, University of Colorado-Boulder, Feb. 1995.

J.D. Guyton and M.F. Schwartz, "Locating Nearby Copies of Replicated Internet Servers," Proc. ACM SIGCOMM 95 Conference, Cambridge, Massachusetts, pp. 288-298 (Aug. 1995).

A. Duda and M.A. Sheldon, "Content Routing in Networks of WAIS Servers," Proc. IEEE 14th International Conference on Distributed Computing Systems, Jun. 1994.

M.A. Sheldon, A. Duda, R. Weiss, J.W. O'Toole, Jr., and D.K. Gifford, "A Content Routing System for Distributed Information Servers," Proc. Fourth International Conference on Extending Database Technology, Mar. 1994.

A. Chankhunthod, P. Danzing, C. Neerdaels, M. Schwartz, and K. Worrell, "A Hierarchical Internet Object Cache," Proc. USENIX Technical Conference 96, San Diego, California, Jan. 1996.

D. Wessels, "Squid Internet Object Cache," http://www.squid-cache.org/, Aug. 1998.

D. Wessels and K. Claffy, "Internet Cache Protocol (ICP), Version 2," RFC 2186, Sep. 1997.

A. Heddaya and S. Mirdad, "WebWave: Globally Load Balanced Fully Distributed Caching of Hot Published Documents," Technical Report BU-CS-96-024, Boston University, Computer Science Department, Oct. 1996.

A. Heddaya and S. Mirdad, "WebWave: Globally Load Balanced Fully Distributed Caching of Hot Published Documents," Proc. IEEE 17th International Conference on Distributed Computing Systems, Baltimore, Maryland, May 1997.

K.W. Ross, "Hash Routing for Collections of Shared Web Caches," IEEE Network, vol. 11, No. 6, Nov. 1997, pp. 37-44.

D.G. Thaler and C.V. Ravishankar, "Using Name-Based Mappings To Increase Hit Rates," IEEE/ACM Transaction on Networking, vol. 6, No. 1 (Feb. 1998).

V. Valloppillil and J. Cohen, "Hierarchical HTTP Routing Protocol," Internet Draft, http://www.nlanr.net/Cache/ICP/draft-vinod-icp-traffic-dist-00.txt (Apr. 21, 1997).

D. Karger, E. Lehman, T. Leighton, M. Levine, D. Lewin, and R. Panigrahy, "Consistent Hashing and Random Trees: Distributed Caching Protocols for Relieving Hot Spots on the World Wide Web," Proc. 29th ACM Symposium on Theory of Computing (STOC 97), El Paso, Texas, 1997.

D. Karger, Sherman, A. Berkheimer, B. Bogstad, R. Dhanidina, K. Iwamoto, B. Kim, L. Matkins, and Y. Yerushalmi, "Web Caching with Consistent Hashing," Proc. 8th International World Wide Web Conference, Toronto, Canada, May 1999.

B.S. Michel, K. Nikoloudakis, P. Reiher, and L. Zhang, "URL Forwarding and Compression in Adaptive Web Caching," Proc. IEEE Infocom 2000, Tel Aviv, Israel, Apr. 2000.

R. Tewari, "Architectures and Algorithms for Scalable Wide-area Information Systems," Ph.D. Dissertation, Chapter 5, Computer Science Department, University of Texas at Austin, Aug. 1998.

R. Tewari, M. Dahlin, H.M. Vin, and J.S. Kay, "Design Considerations for Distributed Caching on the Internet," Proc. IEEE 19th International Conference on Distributed Computing Systems, May 1999.

S. Gadde, M. Rabinovich, and J. Chase, "Reduce, reuse, recycle: An approach to building large Internet caches," in Proc. 6th Workshop Hot Topics in Operating Systems (HotOS-VI), Cape Cod, MA, May 1997, pp. 93-98.

Renu Tewari, Michael Dahlin, Harrick M. Vin, and Jonathan S. Kay, "Design considerations for distributed caching on the internet," Technical report, Department of Computer Sciences, University of Texas Austin, http://www.cs.utexas.edu/users /UTCS/techreports/ (Oct. 1998).

P. Rodriguez and E.W. Briesack, "Continuous Multicast Push of Web Documents over The Internet," IEEE Network Magazine, vol. 12, No. 2, pp. 18-31, 1998.

Z. Fei, S. Bhattacharjee, E.W. Zegura, and M.H. Ammar, "A Novel Server Selection Technique for Improving The Response Time of a Replicated Service," Proc. IEEE Infocom 98, Mar. 1998, pp. 783-791.

Craig Partridge, Trevor Mendez, and Walter Milliken, "Host Anycasting Service," Network Working Group, RFC 1546 (Nov. 1993).

Pablo Rodriguez, Ernst W. Biersack, and Keith W. Ross, "Improving the WWW: Caching or Multicast?," Institut Eurecom 2229, Route Computer Networks and ISDN Systems, pp. 1-17 (Mar. 30, 1998).

Robert L. Carter, et al., "On the network impact of dynamic server selection," Computer Networks 31, pp. 2529-2558 (1999).

J. Garcia-Luna-Aceves and M. Spohn, "Scalable Link-State Internet Routing," ICNP, Sixth International Conference on Network Protocols (ICNP'98), Austin, Texas, pp. 52-61 (Oct. 14-16, 1998).

Bruce Schneier, "Applied Cryptography: Protocols, Algorithms, and Source Code in C," Second Edition, Table of Contents, pp. 30-31, 34-44, 466-474, 483-502, and 10 page errata sheet (1996).

Dykes, Sandra G., et al., "An Empirical Evaluation of Client-side Server Selection Algorithms," IEEE Infocom. vol. 3, Mar. 2000, pp. 1361-1370.

Jueneman, Robert R., "Novell Certificate Extension Attributes," Tutorial and Detailed Design, Version 0.998 (Aug. 7, 1998), 98 pages.

http://www.cache.ja.net/workshop./papers.html (Oct. 3, 2001), 6 pages.

Smith, Bradley R., et al, "Federated Networks Bootstrap Services," Nov. 8, 1998, 2 pages.

Levine, Brian Niel, et al., "New Routing Services for Internet Multicast," Apr. 30, 1998, 17 pages.

Garcia-Luna-Aceves, J. J., et al. "The Core-Assisted Mesh Protocol," IEEE Journal on Selected Areas in Communications, vol. 17, No. 8, Sep. 8, 1999, 15 pages.

Levine, Brian Niel, et al., "Improving Internet Multicast with Routing Labels," 10 pages.

Sandra G. Dykes, et al., "An Empirical Evaluation of Client-side Server Selection Algorithms," IEEE Infocom, vol. 3, pp. 1361-1370 (Mar. 2000).

* cited by examiner

SYSTEM AND METHOD FOR INFORMATION OBJECT ROUTING IN COMPUTER NETWORKS

RELATED APPLICATIONS

The present application is related to and hereby claims the priority benefit of the following commonly-owned and co-pending U.S. Provisional Patent Applications:

(1) Application No. 60/323,126, entitled "SYSTEM AND METHOD FOR DIRECTING CLIENTS TO OPTIMAL SERVERS IN COMPUTER NETWORKS" filed Sep. 10, 2001, by J. J. Garcia-Luna-Aceves and Srinivas Vutukury; and (2) Application No. 60/322,899, entitled "SYSTEM AND METHOD FOR INFORMATION OBJECT ROUTING IN COMPUTER NETWORKS", filed Sep. 10, 2001, by Jyoti Raju, J. J. Garcia-Luna-Aceves and Bradley R. Smith; and the present application is also a continuation in part of commonly owned and co-pending U.S. patent application Ser. No. 09/810,148, entitled "SYSTEM AND METHOD FOR DISCOVERING INFORMATION OBJECTS AND INFORMATION OBJECT REPOSITORIES IN COMPUTER NETWORKS", filed Mar. 15, 2001, by J. J. Garcia-Luna-Aceves, which claims priority from U.S. Provisional Patent Application No. 60/190,331, filed Mar. 16, 2000 and from U.S. Provisional Patent Application No. 60/200,401, filed Apr. 28, 2000, and which issued as U.S. Pat. No. 7,162,539 B2 on Jan. 9, 2007.

FIELD OF THE INVENTION

The present invention relates to a system and method for directing a client (i.e., an information requesting application such as a Web browser) to an optimal content source such as a cache or server (i.e., information object repository) among many available content repositories for servicing of a request for one or more information objects or services.

BACKGROUND

An internetwork is a collection of computer networks interconnected by nodes, each such node may be a general-purpose computer or a specialized device, such as a router. As such, an internetwork is often called a network of networks. The purpose of building an internetwork is to provide information services to end nodes, each end node may be a general-purpose computer or a specialized device, such as a camera or a display. The Internet is an internetwork in which information is organized into packets to be distributed on a store-and forward manner from source to destination end nodes, and in which routers and end nodes use the Internet Protocol (IP) to communicate such packets.

The World Wide Web (also known as WWW or Web) has become an essential information service in the Internet. The Web constitutes a system for accessing linked information objects stored in end nodes (host computers) all over the Internet. Berners-Lee wrote the original proposal for a Web of linked information objects (T. Berners-Lee, "Information Management: A Proposal," CERN Document, March 1989). The Web consists of a vast collection of information objects organized as pages, and each page may contain links to other pages or, more generally, information objects with which content is rendered as audio, video, images, text or data. Pages are viewed by an end user with a program called a browser (e.g., Netscape Navigator$^{Tm}$). The Web browser runs in an end system at the user premises. The client (Web browser) obtains the required information objects from a server (Web server) using a request-response dialogue as part of the Hypertext Transfer Protocol (HTTP). Information objects are identified by means of names that are unique throughout the Internet; these names are called Uniform Resource Locators or URLs. A URL consists of three components:

(1) the protocol or scheme to be used for accessing the object (e.g., http);

(2) the name (a DNS name) of the host on which the object is located; and (3) a local identifier that is unique in the specified host.

Like any large-scale system, the Web requires the use of mechanisms for scaling and reliability. More specifically, as the number of information objects that can be obtained through the Web increases, people find it more difficult to locate the specific information objects they need. Furthermore, as the number of Web users and servers increase, the sites or servers that store the requested information objects may be very far from the users requesting the objects, which leads to long latencies in the access and delivery of information, or the servers storing the information objects may be overwhelmed with the number of requests for popular information objects.

To enable the Web to scale to support large and rapidly increasing numbers of users and a vast and growing collection of information objects, the information objects in the Web must be stored distributedly at multiple servers, in a way that users can retrieve the information objects they need quickly and without overwhelming any one of the servers storing the objects. Accordingly, distributing information objects among multiple sites is necessary for the Web to scale and be reliable. The schemes used to accomplish this are called Web caching schemes. In a Web caching scheme, one or multiple Web caches or proxy Web servers are used in computer networks and the Internet to permit multiple host computers (clients) to access a set of information objects from sites other than the sites from which the content (objects) are provided originally. Web caching schemes support discovering the sites where information objects are stored, distributing information objects among the Web caches, and retrieving information objects from a given Web cache. The many proposals and implementations to date differ on the specific mechanisms used to support each of these services.

Many methods exist in the prior art for determining the server, cache, mirror server, or proxy from which information objects should be retrieved. The prior art dates to the development of the ARPANET in the 1970s and the study and implementation of methods to solve the file allocation problem (FAP) for databases distributed over the ARPANET and computer networks in general.

File allocation methods for distributed databases (e.g., W. W. Chu, "Optimal File Allocation in a Multiple Computer System," IEEE Transactions on Computers, October 1969; S. Mahmoud and J. S. Riordon, "Optimal Allocation of Resources in Distributed Information Networks," ACM Transactions on Data Base Systems, Vol. 1, No. 1, March 1976; H. L. Morgan and K. D. Levin, "Optimal Program and Data Locations in Computer Networks," Communications of the ACM, Vol. 20, No. 5, May 1977) and directory systems (e.g., W. W. Chu, "Performance of File Directory Systems for Data Bases in Star and Distributed Networks," Proc. National Computer Conference, 1976, pp. 577-587; D. Small and W. W. Chu, "A Distributed Data Base Architecture for Data Processing in a Dynamic Environment," Proc. COMPCON 79 Spring) constitute some of the earliest embodiments of methods used to select a delivery site for accessing a file or information object that can be replicated at a number of sites.

Another example of this prior art is the method described by Chiu, Raghavendra and Ng (G. Chiu, C. S. Rahgavendra, and S. M. Ng, "Resource Allocation with Load Balancing Consideration in Distributed Computing Systems," Proc. IEEE INFOCOM 89, Ottawa, Ontario, Canada, April 1989, pp. 758-765). According to this method, several identical copies of the same resource (e.g., a file, an information object) are allocated over a number of processing sites (e.g., a mirror server, a cache) of a distributed computing system. The method attempts to minimize the cost incurred in replicating the resource at the processing sites and retrieving the resource by users of the system from the processing sites.

Several different approaches exist in the prior art for discovering information objects in Web caching schemes. Recent work has addressed the same resource allocation and discovery problems within the context of Internet services. Guyton and Schwartz (J. D. Guyton and M. F. Schwartz, "Locating Nearby Copies of Replicated Internet Servers," Technical Report CU-CS-762-95, Department of Computer Science, University of Colorado-Boulder, February 1995; Proc. ACM SIGCOMM 95 Conference, Cambridge, Mass., August 1995, pp. 288-298) describe and analyze server location techniques for replicated Internet services, such as Network Time Protocol (NTP) servers and Web caches. Guyton and Schwartz propose gathering location data with router support in two ways. In one method, routers advertise the existence or absence of replicated servers as part of their normal routing exchanges involving network topological information. Routers examine a distance metric for the advertised servers in a way that each router retains knowledge of at least the nearest servers. In this way, each router in an internetwork has enough knowledge to direct client requests to the nearest servers, without necessarily having to maintain knowledge of all the servers in the internetwork. In another method, servers poll routers for the content of their routing tables. Guyton and Schwartz also describe a method for gathering location data using routing probes without router support by means of measurement servers. According to this method, measurement servers explore the routes to the replicated servers providing services and content to clients. When a client asks a measurement server for a list of nearby servers from which to request a service, the measurement server takes into account the route back to the client in deciding the list of servers that appear closer to the client.

One approach to object discovery consists in organizing Web caches hierarchically. In a hierarchical Web cache architecture, a parent-child relationship is established among caches; each cache in the hierarchy is shared by a group of clients or a set of children caches. A request for an information object from a client is processed at a lowest-level cache, which either has a copy of the requested object, or asks each of its siblings in the hierarchy for the object and forwards the request to its parent cache if no sibling has a copy of the object. The process continues up the hierarchy, until a copy of the object is located at a cache or the root of the hierarchy is reached, which consists of the servers with the original copy of the object.

One of the earliest examples of hierarchical Web caching was the Discover system (A. Duda and M. A. Sheldon, "Content Routing in Networks of WAIS Servers," Proc. IEEE 14th International Conference on Distributed Computing Systems, June 1994; M. A. Sheldon, A. Duda, R. Weiss, J. W. O'Toole, Jr., and D. K. Gifford, "A Content Routing System for Distributed Information Servers," Proc. Fourth International Conference on Extending Database Technology, March 1994), which provides associative access to servers; the user guides the refinement of requests.

Harvest (A. Chankhunthod, P. Danzing, C. Neerdaels, M. Schwartz, and K. Worrell, "A Hierarchical Internet Object Cache," Proc. USENIX Technical Conference 96, San Diego, Calif., January 1996) and Squid (D. Wessels, "Squid Internet Object Cache," http://www.squid.org, August 1998) are two of the best known hierarchical Web cache architectures. Harvest and Squid configure Web caches into a static hierarchical structure in which a Web cache has a static set of siblings and a parent. The Internet Caching Protocol or ICP (D. Wessels and K. Claffy, "Internet Cache Protocol (ICP), Version 2," RFC 2186, September 1997) is used among Web caches to request information objects.

In the Harvest hierarchies, siblings and parents are configured manually in Web caches or proxies; this is very limiting and error prone, because reconfiguration must occur when a cache enters or leaves the system. A more general limitation of hierarchical Web caching based on static hierarchies is that the delays incurred in routing requests for information objects can become excessive in a large-scale system, and the latency of retrieving the information object from the cache with a copy of the object can be long, because there is no correlation between the routing of the request to a given cache in the hierarchy and the network delay from that cache to the requesting client. Furthermore, some Web caches may be overloaded with requests while others may be underutilized, even if they store the same objects.

In the WebWave protocol (A. Heddaya and S. Mirdad, "WebWave: Globally Load Balanced Fully Distributed Caching of Hot Published Documents," Technical Report BU-CS-96-024, Boston University, Computer Science Department, October 1996; A. Heddaya and S. Mirdad, "WebWave: Globally Load Balanced Fully Distributed Caching of Hot Published Documents," Proc. IEEE 17th International Conference on Distributed Computing Systems, Baltimore, Md., May 1997) Web caches are organized as a tree rooted at the server that provides the original copy of one object or a family of information objects; the leaves of the tree are the clients requesting the information objects, and the rest of the nodes in the tree are Web caches. The objective of the protocol is to achieve load balancing among Web caches; each Web cache in such a tree maintains a measurement of the load at its parent and children in the tree, and services or forwards the request to its parent automatically based on the load information. This approach reduces the possibility of overloading Web caches as in the Harvest approach to hierarchical Web caching; however, delays are still incurred in the propagation of requests from heavily loaded Web caches to their ancestors in the Web hierarchy.

Hash routing protocols (K. W. Ross, "Hash Routing for Collections of Shared Web Caches," IEEE Network, Vol. 11, No. 6, November 1997, pp 37-44) constitute another approach to support object discovery in shared caches. Hash routing protocols are based on a deterministic hashing approach for mapping an information object to a unique cache (D. G. Thaler and C. V. Ravishankar, "Using Name-Based Mappings To Increase Hit," EEE/ACM Trans. Networking, 1998; V. Valloppillil and J. Cohen, "Hierarchical HTTP Routing Protocol," Internet Draft, http://www.nlanr.net/Cache/ICP/draft-vinod-icp-traffic-dist-OO.txt) to distribute the information objects (universal resource locator or URL in the case of the Web) among a number of caches; the end result is the creation of a single logical cache distributed over many physical caches. An important characteristics of this scheme is that information objects are not replicated among the cache sites. The hash function can be stored at the clients or the cache sites. The hash space is partitioned among the N cache sites. when a client requires access to an information object o, the value of the hash function for o, h(o), is calculated at the client or at a cache site (in the latter case the cache would be configured at the client, for example). The value of h(o) is the address of the cache site to contact in order to access the information object o.

The Cache Resolver is another recent approach to hierarchical Web caching (D. Karger, E. Lehman, T. Leighton, M. Levine, D. Lewin, and R. Panigrahy, "Consistent Hashing and Random Trees: Distributed Caching Protocols for Relieving Hot Spots on the World Wide Web," Proc. 29th ACM Symposium on Theory of Computing (STOC 97), El Paso, Tex., 1997; D. Karger, Sherman, A. Berkheimer, B. Bogstad, R. Dhanidina, K. Iwamoto, B. Kim, L. Matkins, and Y. Yerushalmi, "Web Caching with Consistent Hashing," Proc. 8th International World Wide Web Conference, Toronto, Canada, May 1999). This approach combines hierarchical Web caching with hashing and consists of two main tools, random cache trees and consistent hashing. A tree of Web caches is defined for each information object. When a browser (client) requires an information object, it picks a leaf of the tree and submits a request containing its identifier, the identifier of the object, the sequence of caches through which the request is to be routed if needed. A Web cache receiving a request, it determines if it has a local copy of the page and responds to the request if it does; otherwise, it forwards the request to the next Web cache in the path included in the request.

A Web cache starts maintaining a local copy of an information object when the number of requests it receives for the object reaches a predefined number. A client selects a Web cache by means of consistent hashing, which disseminates requests to leaves of the Web caching hierarchy evenly but, unlike traditional hashing techniques, need not redistribute an updated hash table every time a change occurs in the caching hierarchy (e.g., a new Web cache joins or a Web cache fails). Because caching is difficult to implement or add to existing Web browsers, the Cache Resolver approach implements the hashing in DNS servers modified to fit this purpose.

The remaining limitations with this approach stem from the continuing use of a hierarchy of Web caches and the need to implement a hashing function in either Web clients or DNS servers. Routing a request through multiple Web caches can incur substantial delays for clients to retrieve information objects that are not popular among other clients assigned to the same Web cache by the hashing function. Additional delays, even if small, are incurred at the DNS server that has to provide the address of the Web cache that the client should access. Furthermore, the DNS servers supporting the consistent hashing function must receive information about the loading of all the Web caches in the entire system, or at least a region of the system, in order to make accurate load-balancing decisions.

This DNS-based approach, without the use of hierarchies of Web caches, is advocated in the Akamai CDN solution (F. T. Leighton and D. M. Lewin, "Global Hosting System," U.S. Pat. No. 6,108,703, Aug. 22, 2000). The "global hosting system" advocated by Akamai assumes that a content provider services an HTML document in which special URLs specifying a domain name specific to Akamai. When the client needs to obtain the WP address of the Web cache hosting the content specified in the special URL, the client first contacts its local DNS. The local DNS is pointed to a "top-level" DNS server that points the local DNS to a regional DNS server that appears close to the local DNS. The regional DNS server uses a hashing function to resolve the domain name in the special URL into the address of a Web cache (hosting server) in its region, which is referred to as the target Web cache in the present application, in a way that the load among Web caches in the region is balanced. The local DNS passes the address of that Web cache to the client, which in turn sends its request for the information object to that Web cache. If the object resides in the target Web cache, the cache sends the object to the client; otherwise, the object is retrieved from the original content site.

The global hosting system advocated by Akamai was intended to address problems associated with traditional load-balanced mirroring solutions in which a load balancer or a hierarchy of load balancers redirect requests to one of a few hosting sites to balance the load among such sites. Companies such as Cisco Systems of Santa Clara, Calif., F5 Networks, Inc. of Seattle, Wash., Resonate, Inc. of Sunnyvale, Calif., Nortel Networks of Brampton, Ontario, and Foundry Networks, Inc. of San Jose, Calif. currently provide examples of load-balanced solutions. The limitations of the global hosting system are inherent to the fact that the approach is, in essence, a DNS-based load-balanced mirroring solution. The global hosting system selects a target Web cache based entirely on the region that appears to favor the local DNS, which need not favor the client itself, and balances the load among Web caches without taking into account the latency between the Web caches and the clients. In the case of a cache miss, the information object has to be retrieved from the original content site, which means that latencies in the delivery of content can vary widely, unless the content is mirrored in all the caches of all regions.

Another alternative approach to hierarchical web caching and hash routing protocols consists of forwarding client requests for URLs using routing tables that are very similar to the routing tables used today for the routing of IP packets in the Internet (L. Zhang, S. Michel, S. Floyd, and V. Jacobson, "Adaptive Web Caching: Towards a New Global Caching Architecture," Proc. Third International WWW Caching Workshop, Manchester, England, June 1998, B. S. Michel, K. Nikoloudakis, P. Reiher, and L. Zhang, "URL Forwarding and Compression in Adaptive Web Caching," Proc. IEEE Infocom 2000, Tel Aviv, Israel, April 2000). According to this approach, which is referred to as "URL request forwarding" herein, Web caches maintain a "URL request routing table" and use it to decide how to forward URL requests to another Web caches when requested information objects are not found locally. The keys of the URL request routing tables are URL prefixes, which are associated with one ore more identifiers to the next-hop Web caches or cache groups, and a metric reflecting the average delay to retrieve a request from a matching URL.

In this approach, an entry in the URL request routing table specifies a URL prefix and the next-hop Web cache towards an area or neighborhood of Web caches where the object resides. Ideally, a Web cache needs to know where a copy of a given object resides; however, because of the large number of objects (identified by URLs) that can be requested in a system, the URL request forwarding approach requires Web caches to be organized into areas or neighborhoods. All Web caches within the same area know the objects available in every other Web cache in the same area. In addition, for those objects that are not found in the area of a Web cache, the Web cache also maintains the next-hop Web cache towards the area in which a Web cache with the content resides.

Unfortunately, this approach has several scaling and performance limitations. First, requiring each Web cache to know all the Web caches where each object in the area resides incurs a large overhead, which is akin to the overhead of a traditional topology-broadcast protocol for IP routing, with the added disadvantage that the number of objects that can reside in an area can be much larger than the number of IP address ranges maintained in backbone routers of the Internet. Second, because Web caches only know about the next hop towards a URL that does not reside in a region, a request for an object that lies outside the area of a Web cache may traverse multiple Web-cache hops before reaching a Web cache in the area where an object is stored. This introduces additional latencies akin to those incurred in the caching hierarchies proposed in other schemes discussed above. Third, it is difficult to modify Web caches in practice to implement the mechanisms needed for the forwarding of URL requests.

To reduce the delays incurred in hierarchical Web caches, Tewari, Dahlin, Vin and Kay (R. Tewari, "Architectures and Algorithms for Scalable Wide-area Information Systems," Ph.D. Dissertation, Chapter 5, Computer Science Department, University of Texas at Austin, August 1998; R. Tewari, M. Dahlin, H. M. Vin, and J. S. Kay, "Design Considerations for Distributed Caching on the Internet," Proc. IEEE 19th International Conference on Distributed Computing Systems, May 1999) introduce hint caches within the context of a hierarchical Web caching architecture. According to this scheme, a Web cache maintains or has access to a local hint cache that maintains a mapping of an object to the identifier of another Web cache that has a copy of the object and is closest to the local hint cache. Web caches at the first level of the hierarchy maintain copies of information objects, while Web caches at higher levels only maintain hints to the objects. Hints are propagated along the hierarchy topology from the Web caches lower in the hierarchy to Web caches higher in the hierarchy. Furthermore, a Web cache with a copy of an object does not propagate a hint for the object. The limitation with this approach is that a Web caching hierarchy must still be established, which needs to be done manually in the absence of an automated method to establish the hierarchy, and the Web caching hierarchy must match the locality of reference by clients to reduce control overhead.

A number of proposals exist to expedite the dissemination of information objects using what is called "push distribution" and exemplified by Backweb, Marimba and Pointcast ("BackWeb: http://www.backweb.com/"; "Marimba: http:www.marimba.comn "; "Pointcast: http://www.pointcast.com/"). According to this approach, a Web server pushes the most recent version of a document or information object to a group of subscribers. The popular Internet browsers, Netscape Navigator and Internet Explorer™, use a unicast approach in which the client receives the requested object directly from the originating source or a cache. As the number of subscribers of a document or information object increases, the unicast approach becomes inefficient because of processing overhead at servers and proxies and traffic overhead in the network. The obvious approach to make push distribution scale with the number of subscribers consists of using multicast technology. According to this approach (P. Rodriguez and E. W. Biersack, "Continuous Multicast Push of Web Documents over The Internet," EEE Network Magazine, Vol. 12, No. 2, pp. 18-31, 1998), a document is multicasted continuously and reliably within a multicast group. A multicast group is defined for a given Web document and subscribers join the multicast group of the Web document they need to start receiving the updates to the document. A multicast group consists of the set of group members that should receive information sent to the group by one or multiple sources of the multicast group. The main shortcoming of this particular approach to push distribution are:

The portion of the Internet where subscribers are located must support multicast routing distribution. A multicast address and group must be used for each Web document that is to be pushed to subscribers, which becomes difficult to manage as the number of documents to be pushed increases. Furthermore, Rodriguez, Biersack, and Ross (P. Rodriguez, E. W. Biersack, and K. W. Ross, "Improving The WWW: Caching or Multicast?," Institut EURECOM 2229, Route Comptuer Network and ISDN Systems, pp. 1-17 (Mar. 30, 1998) have shown that multicasting Web documents is an attractive alternative to hierachical web caching only when the documents to be pushed are very popular, caching distribution incurs less latency.

Kenner and Karush (B. Kenner and A. Karush, "System and Method for Optimized Storage and retrieval of Data on a Distributed Computer Network," U.S. Pat. No. 6,003,030, Dec. 14, 1999) propose a method for expediting the delivery of information objects to end users. In this method, the end user site is equipped with special software in addition to the Web browser. This software consists of a configuration utility and a client program. The configuration utility is used to download a delivery site file specifying a list of the delivery sites (Web caches or originating Web servers) from which the information objects can be retrieved and a suite of tests that can be run to determine which delivery site to contact. The limitations with this approach stem from the fact that it is not transparent to end user sites. In particular, the end user site needs to run additional software; performance tests must be conducted from the end-user site to one or more delivery sites to decide which site to use; and when changes occur to the delivery sites, a new version of the delivery site file must be retrieved by the end-user site, or new performance tests must be conducted.

Another approach to helping select servers in a computer network (Z. Fei, S. Bhattacharjee, E. W. Zegura, and M. H. Ammar, "A Novel Server Selection Technique for Improving The Response Time of a Replicated Service" Proc. EEE Infocom 98, March 1998, pp. 783-791) consists of broadcasting server loading information after a certain load threshold or time period is exceeded. The limitation of this approach is that, just as with topology-broadcast protocols used for routing in computer networks, the scheme incurs substantial overhead as the number of servers increases.

Another recent approach to directing clients to hosting sites with requested information objects or services is the replica routing approach proposed by Sightpath, Inc. (D. K. Gifford, "Replica Routing," U.S. Pat. No. 6,052,718, Apr. 18, 2000). According to the Replica Routing approach, an information object or service is replicated in a number of replica servers. The replica routing system redirects a client requesting the information object or service to a "nearby" replica of the object or service. In one approach, all replica routers know the replica advertisements from each of the replica servers in the system, which summarize information about their location and observations about the local internetwork topology and performance. Using this flooding of advertisements, a replica router discerns which replica server appears nearby any one client. However, requiring each replica router to receive the advertisements from every other replica server becomes impractical as the number of replica servers and replica routers increases.

To remedy this problem, replica routers are organized into a hierarchy, and replica advertisements are propagated only part way up such router hierarchy. A client request is routed to the root of the hierarchy and from there is forwarded down the hierarchy, until it reaches a replica router with enough knowledge about the replica's internetwork location to make an informed redirection decision. This approach has similar performance and scaling limitations as the prior approaches summarized above based on hierarchies of Web caches, flooding of information among caches or servers, and forwarding of requests over multiple hops.

Another recent approach to directing clients to hosting sites with requested information objects or services is the enhanced network services method by Phillips, Li, and Katz (S.G. Phillips, A. J. Li, and D. M. Katz, "Enhanced Network Services Using a Subnetwork of Communicating Processors," U.S. Pat. No. 6,182,224, Jan. 30, 2001.). Insofar as directing clients to servers, the enhanced network services method is very similar to the gathering of location data with router support advocated by Guyton and Schwartz described previously. As in the Guyton and Schwartz's approach, routers using the enhanced network services approach gather network topological data and also include as part of their normal routing exchanges information about the hosts that can provide content and services to clients; routers can then rank the hosts according to their relative distance in the network. In addition to data regarding hosts that can provide services, routers in the enhanced network services approach can include in their normal routing exchanges host information regarding logged-in users and willingness to pay for performing a designated service. In contrast to the proposal by Guyton and Schwartz, the enhanced network services approach does not attempt to limit the amount of network topological information that routers need to exchange in order to direct clients to best qualified servers. This approach has, therefore, similar performance and scaling limitations as the prior approaches summarized above based on flooding of information among caches or servers, and forwarding of requests over multiple hops.

SUMMARY OF THE INVENTION

The present invention address shortcomings of the above-described schemes.

In one embodiment, the present method returns, in response to a request therefore, an address of a first server that should service a second server's request for an information object. The address of the first server is selected according to specified performance metrics, for example one or more of average delay from the first server to the second server, average processing delays at the first server, reliability of a path from the first server to the second server, available bandwidth in said path, and loads on the first server. Preferably, though not necessarily, the first server is an optimum server for servicing the second server's request.

A further embodiment of the invention provides a communication protocol that includes one or more messages passed between Web routers over a reliable transmission protocol used for inter-Web router communication. These messages include information which allows the Web routers to dynamically update mappings of information objects to server addresses based on specified performance metrics. Preferably, the mappings are optimal mappings of the information objects to the server addresses. The messages report updated distances from the server addresses to another information object. For each updated distance, the messages further report an associated server.

In yet another embodiment, an address of a requesting server seeking an information object is mapped to an address of an information object repository that has a best distance to the requesting server according to specified performance metrics. Distance information between information object repositories may be computed according to a shortest-path first algorithm.

In still another embodiment, mapping an information object and a server by only trusting a neighbor node of a communication network that offers a shortest path to the server is provided. In the case of two or more equal distances, that mapping information which is received is adopted.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

Figure 1:
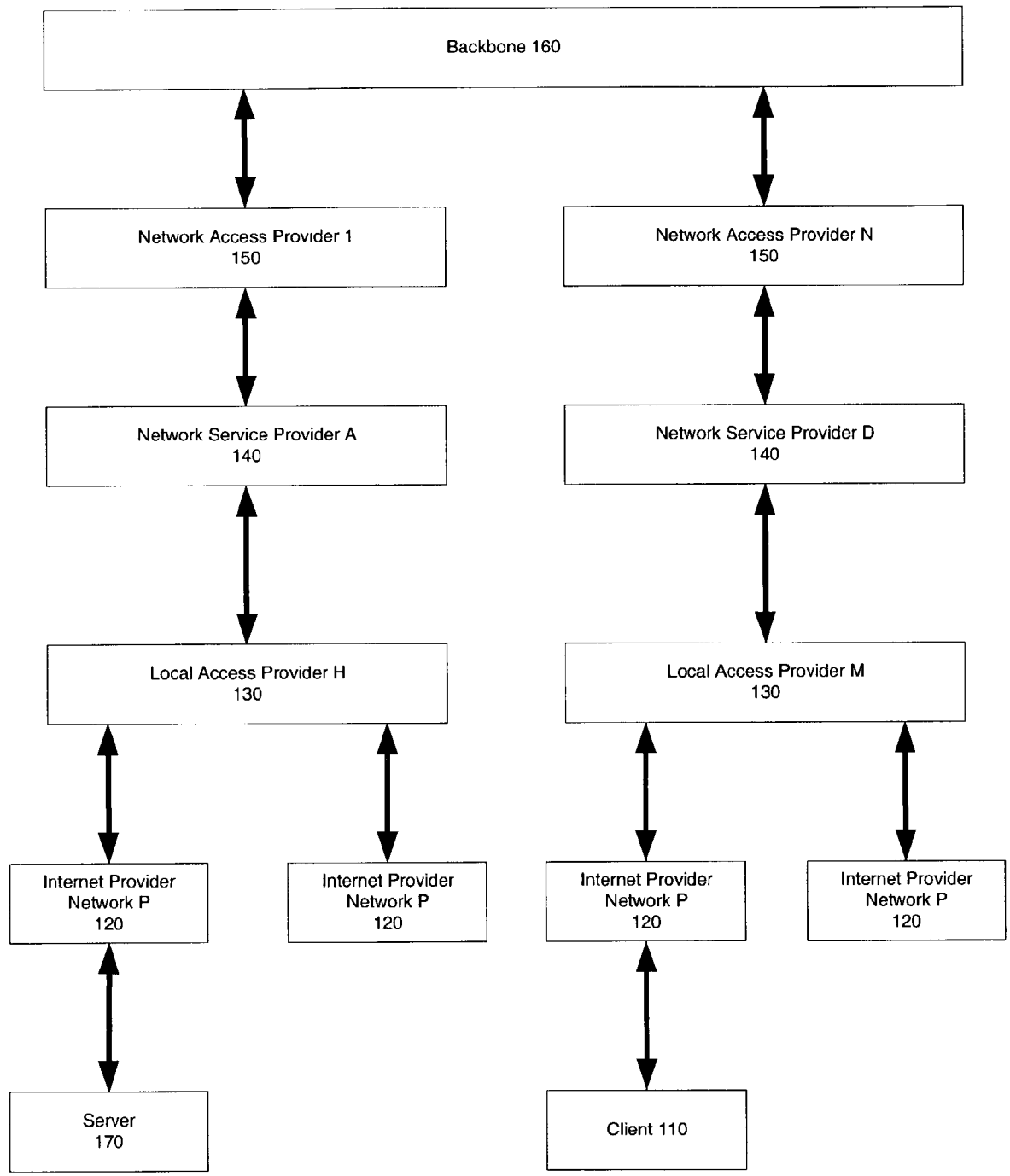
FIG. 1 illustrates an internetwork in which the methods and systems of the present invention may operate.

The core of the Internet is congested and, hence, delivering content across the Internet incurs high latency. Increasing the bandwidth of the "last mile" (e.g., the last link in communication path to the end user or content source) via high-speed modems and digital subscriber line (DSL) technology, for example, alone will not improve the end-user experience of the Internet. What is required is a reduction in the end-to-end latencies of the Internet by avoiding congestion points in the core of the Internet.

To avoid Internet congestion and reduce latencies, content (e.g., web pages and related information objects) must be moved to the edge, i.e., to locations that are close to the clients. This requires maintaining copies of content on several caches (or servers or other storage devices, which collectively may be and are referred to herein as information object repositories) located around the Internet, and then directing clients to an optimum information object repository for servicing of a request. The present invention enables this functionality.

Stated differently, the present invention provides a method and system for directing a client (e.g., a Web browser) or another requestor (e.g., a server, name server, directory server, cache or other computer system) to an optimal information object repository (e.g., a server or cache) among many available such devices. An optimal information object repository, from a requestor's viewpoint, may be one that offers the lowest response time in delivering a requested information object. When the information object repository does not hold the requested information object (which term is used herein to include both information objects and services), it obtains that information object from another information object repository that has the information object. In the case that none of the information object repositories in the system have the requested information object, the information object repository that first received the request may approach the main or origin content server to obtain the requested information object. As used herein, the term origin content server is meant to indicate a server that serves as the origination point for a piece of content (e.g., text, video, audio, etc.). Such content may subsequently be replicated at one or more Web caches (or other information object repositories). Thus, a method and system for the discovery of information objects and information object repositories storing those information objects distributed over computer networks will be described herein.

In the following description, numerous specific details are set forth in order to provide a thorough understanding of the present invention. However, it will be evident to those of ordinary skill in the art that some of these specific details need not be used to practice the present invention and/or that equivalents thereof may be used. In other cases, well-known structures and components have not been shown in detail to avoid unnecessarily obscuring the present invention. Thus, although discussed with reference to certain illustrated embodiments, upon review of this specification, those of ordinary skill in the art will recognize that the present system and methods may find application in a variety of systems and the illustrated embodiments should be regarded as exemplary only and should not be deemed to be limiting in scope.

Some portions of the description that follow are presented in terms of algorithms and symbolic representations of operations on data within a computer memory (e.g., in pseudocode). These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, the present invention may be used to determine an optimum information object repository from which to retrieve an information object or service when a client (or other requester) requests such an information object or service from a server (or other information object repository) that does not have the requested item or a copy thereof. Upon receiving an instruction to do so, the server that has been contacted by the client contacts the information object repository that has been determined to be the optimum one using the methods and procedures of the present invention and directly requests the information object or service.

The address of the information object repository returned in response to the request is the one that maintains a local copy of the originally requested information object or service and is the "best" information object repository selected according to specified performance metrics. It is assumed in this discussion, therefore, that the information object repositories are connected using a virtual (or physical) network and can reach each other. The specified performance metrics may include one or more of an average delay from one information object repository to another along the network(s) (i.e., network delays), average processing delays at an information object repository, reliability of a path from one information object repository to another, available bandwidth in said path, and loads on the various information object repositories.

As will become apparent, in order to enable the functionality provided by the present invention, so-called Web routers are utilized. In the present discussion, the term Web router refers to an embodiment of a computer system configured in accordance with the methods (described below) needed to map or associate the identifier of an information object or service with the address of the optimal information object repository that can deliver the requested information object or service to another server (i.e., the requesting server that will ultimately respond to the original client request). The performance metrics used by Web routers to choose the information object repository(ies) that should provide the requested information object(s) may include any of the above-noted parameters. The functionality of a Web router can be co-located and/or implemented as part of a content server, a Web server, a Web cache, a router or as a separate entity. To simplify its description, the Web router is described and treated herein as a separate entity. Web routers may be implemented in software to be executed by general-purpose (or special-purpose) computer systems, or some or all of a Web router's functionality may be implemented in hardware. Such details are not critical to the present invention.

Web routers make use of a communication protocol to pass messages between one another over a reliable transmission protocol. These messages include information that allows the Web routers to dynamically update the mappings of identifiers of information objects and services to information object repository addresses based on one or more of the specified performance metrics. As indicated, these mappings may, and preferably do, specify optimal associations of information object identifiers to information object repository addresses. Also, the messages passed using the inter-Web router communication protocol may further report an associated address of a Web router co-located with an information object repository (optimal or otherwise) that contains the information object that is the subject of the message.

In order to produce the above-mentioned mappings, distances (e.g., measured in terms of link costs and the like) need to be measured. Thus, the present invention makes use of a routing protocol that provides accurate distances from one Web router to another, these distances being based on one or more of the specified performance metrics. In one particular embodiment, a routing protocol known as ALP is used for this purpose (for further information on the Adaptive Link-State Protocol or ALP see, J. J. Garcia-Luna-Aceves and M. Spohn, "Scalable Link-State Internet Routing," Proc. IEEE International Conference on Network Protocols (ICNP 98), Austin Tex., Oct. 14-16, 1998, pp. 52-61, incorporated herein by reference), though this is merely for convenience and many other suitable protocols exist and may be used equally as well. In addition, an interfacing protocol between an information object repository and an associated Web router co-located at the site is useful in conjunction with the present invention. In one particular embodiment, the Web Router Communication Protocol (WRCP) is used, however this is merely for convenience and other protocols may be used equally as well, to inform a Web router of the information objects and services added and deleted from its local information object repository.

Before describing further details of the present invention, an overview of an internetwork environment in which Web routers may be deployed will be presented. For purposes of the present invention, a topology of Web routers is defined such that a given Web router has only a subset of all the Web routers in a given system as its neighbor Web routers. Web routers that are neighbors connect to each other using tunnels across one or more communication links. The topology of Web routers and tunnels between them constitutes a virtual overlay network (VON). That is, a VON is defined which interconnects the Web routers and overlays an internetwork made up of conventional IP routers, information object repositories, and other network components. In the VON, each tunnel link is assigned a value that describes the performance metric across the tunnel.

FIG. 1 illustrates an internetwork 100 and the methods and systems described herein enable the direction of clients and/or servers, etc. to either information objects or the caches and servers storing information objects distributed over computer networks such as internetwork 100. One example of an internetwork 100 is the Internet. Other examples include enterprise networks, local area networks, wide area networks, metropolitan area networks and networks of such networks. In the case where internetwork 100 is the Internet, clients 110 will generally access content located at remote servers 170 through a series of networks operated by different providers. For example, clients 110 may have accounts with local ISPs 120 that enable the clients to connect to the Internet using conventional dial-up connections or one of a variety of high-speed connections (e.g., DSL connections, cable connections, hybrids involving satellite and dial-up connections, etc.). ISPs 120, in turn, may provide direct connections to the Internet or, as shown, may rely on other service providers 130, 140, 150 to provide connections through to a set of high-speed connections between computer resources known as a backbone 160. Connecting to a host (e.g., server 170) may thus involve connecting through networks operated by a variety of service providers.

Figure 2:
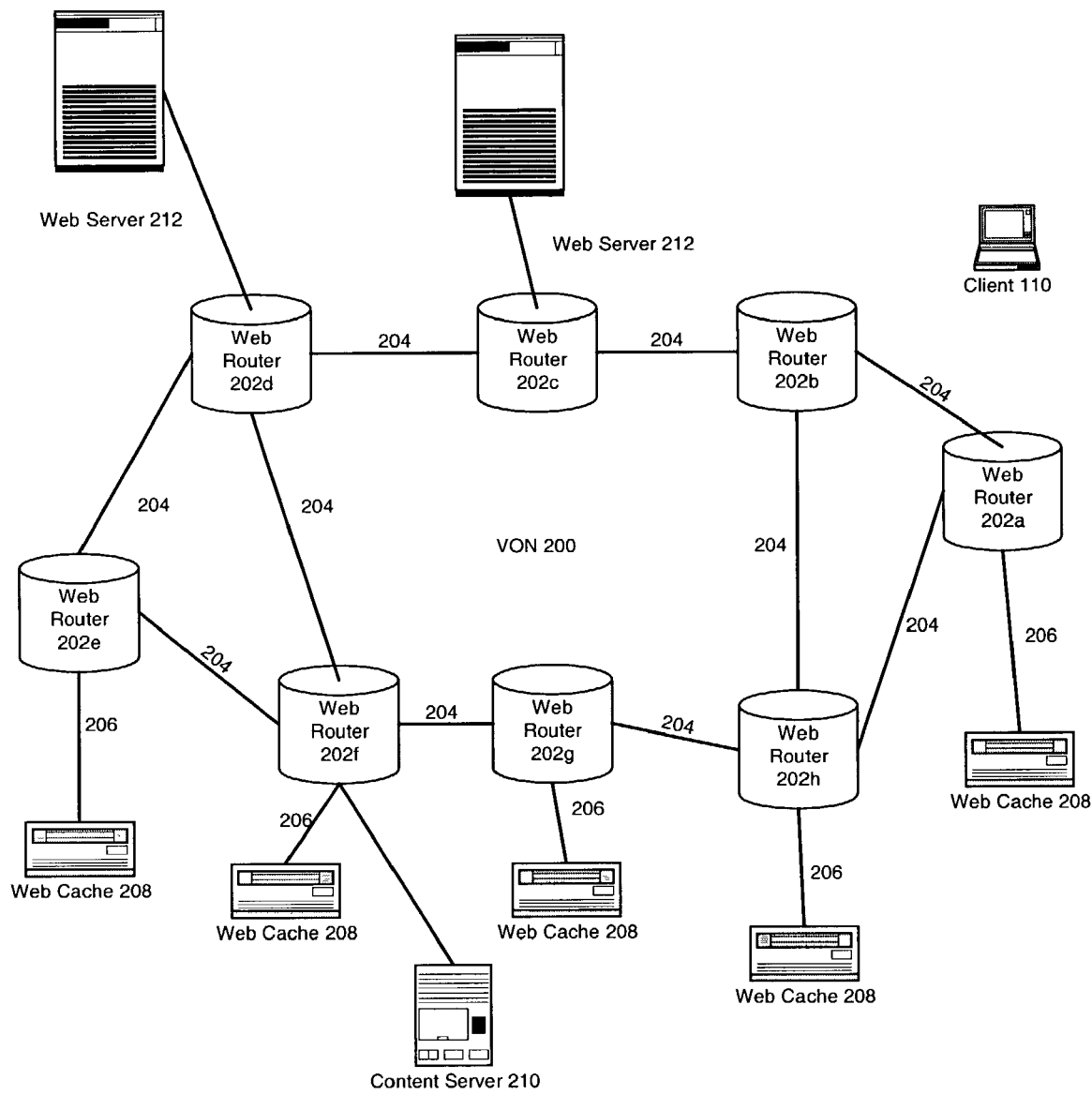
FIG. 2 illustrates a virtual overlay network of Web routers configured in accordance with an embodiment of the present invention.

FIG. 2 illustrates a VON 200 of Web routers 202a-202h defined on top of the physical topology of an internetwork, such as the Internet, consisting of routers interconnected via point-to-point links or networks. The virtual network of Web routers includes point-to-point links 204 configured between the Web routers, and the links 206 configured between a Web router 202 and one or more Web caches 208 and content servers 210. Such links 204, 206 can be implemented using tunnels (e.g., Internet protocol (IP) tunnels) between Web routers 202 and between Web routers 202 and Web caches 208. As discussed above, messages can be exchanged between the Web routers 202 via the tunnels. As shown in the figure, a client 110 is not necessarily part of the virtual network of Web routers.

In one embodiment of the present invention, a collection of one or multiple Web routers 202 is used to refer the request for an object to a Web cache 208 or content server 210 that is able to transfer the requested object to the requester while satisfying a given set of parameters, such as network delays, bandwidth availability, reliability of paths from the chosen sites to the target client 110, and loads on the Web caches 208 and content servers 210. The method used to select the best site from which information objects should be retrieved by user sites (clients) is transparent to the user sites, and the computer network or internetwork over which the system operates need not support multicast delivery to end-user sites.

Figure 3:
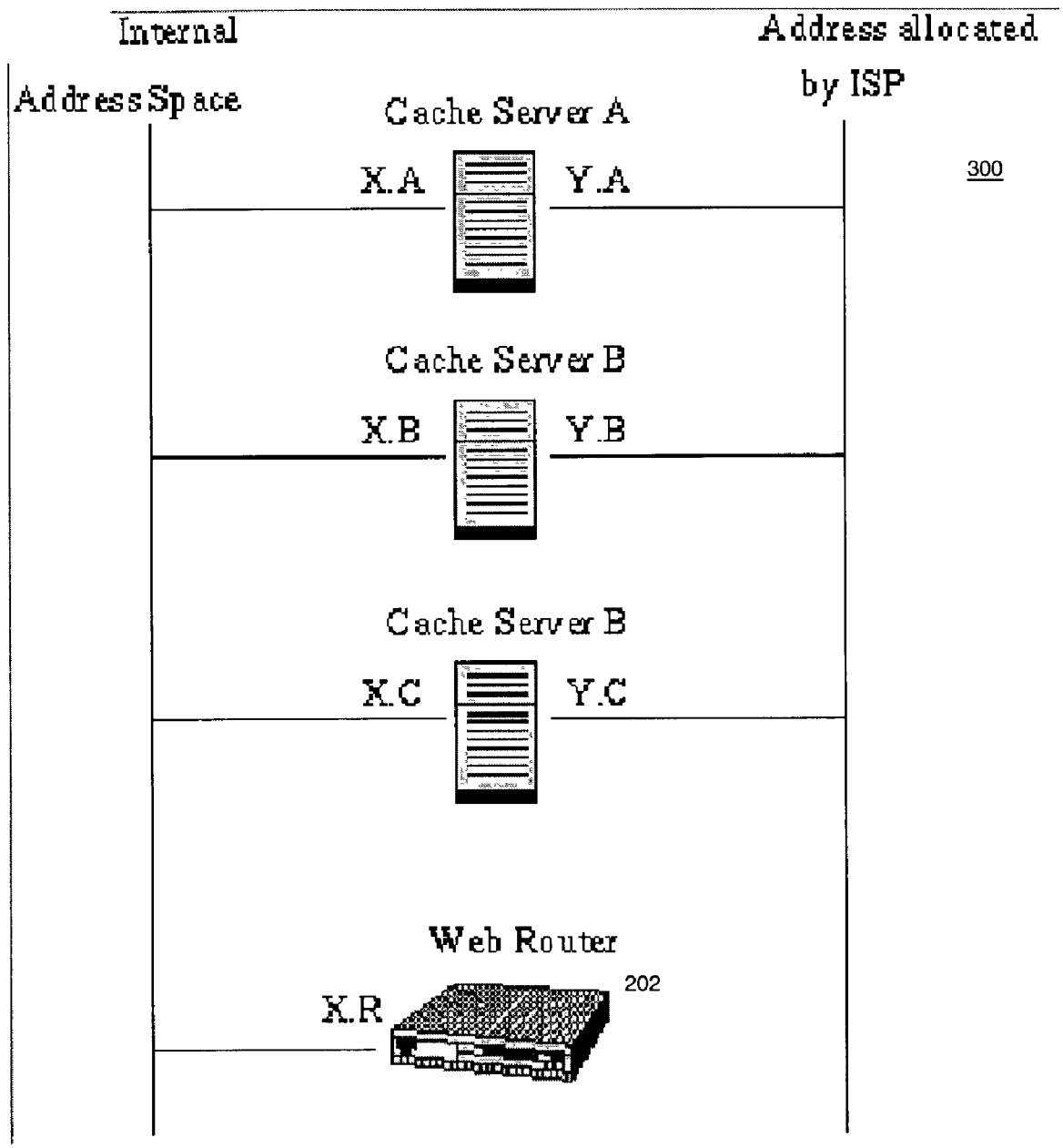
FIG. 3 illustrates a hosting site configured with multiple information object repositories and a Web router that operates in accordance with an embodiment of the present invention.

Although shown as separate entities in FIG. 2, it should be remembered that Web routers may be co-located with information object repositories (e.g., a Web server, a Web cache, or an original content server) as shown in FIG. 3, which is a depiction of a cache site or a hosting site 300. Cache servers A, B and C may also be configured in an internetwork address space by the host ISP. At the same time an internal address space for intercommunication between the caches A, B and C and the web router 202 may be configured. This internal address space may be used within the VON 200 for inter-Web router communications.

As indicated above, to reduce communication and processing overhead in Web routers a topology of Web routers is defined such that a given Web router has as its neighbor Web routers a subset of all the Web routers in the system (where the term system refers to all or a portion of the VON 200 for Web routers discussed above). A Web router may thus be configured with its set of neighbor Web routers. Such a configuration may be expressed as a table of neighbor Web routers that is defined by a network service provider and/or is dynamically updated. In some cases, a Web router may dynamically select the set of neighbor Web routers with which it should communicate out of all of the Web routers in the system.

A Web router preferably communicates with its neighbor Web routers using the Web Information Locator by Distance (WILD) protocol. The WILD protocol is disclosed in commonly owned U.S. Provisional Application No. 60/200,401, entitled "System and Method for Discovering Optimum Information Object Repositories in Computer Networks (WILD Protocol), filed Apr. 28, 2000 by J. J. Garcia-Luna-Aceves and Bradley R. Smith, now replaced by commonly owned and co-pending U.S. patent application Ser. No. 09/810,148, entitled "System and Method for Discovering Information Objects and Information Object Repositories in Computer Networks", filed Mar. 15, 2001, by J. J. Garcia-Luna-Aceves, the complete disclosures of which are hereby incorporated by reference. The WILD communication protocol provides for the exchange of one or more inter-Web router messages via the tunnels. These messages carry the mappings specifying the association between optimal information object repositories and information objects according to the specified metrics. When these mappings change due to changes in the topology of the Internet, the messages carry updated distance information (e.g., as computed according to the performance metrics) in the maps. Thus, using WILD each Web router implements a distributed algorithm and executes a communication protocol with which it determines:

(1) the address of all the other Web routers participating in the same virtual overlay network; and (2) the optimum distance to each Web router (i.e., the associated information object repository) in the VON and the neighbor Web router that offers such a distance.

The Web routers employ special rules when updating their local maps in response to received messages. The WILD protocol (or simply WILD) running at each Web router then constructs tables (which are stored locally in memory or other computer-readable media) containing the optimal mapping information. Each Web router uses the tables computed by WILD for directing a requestor to an optimal information object repository. Further details regarding the manner in which the maps and tables are generated and shared among Web routers ma be found in co-pending Application No. 60/323,126, entitled "System and Method for Directing Clients to Optimal Servers in Computer Networks" filed Sep. 10, 2001, the complete disclosure of which is hereby incorporated by reference. Briefly, however, one or more tables are constructed at each Web router and these tables contain client-to-server distance information. The tables are stored in a computer-readable medium accessible by the corresponding Web router and are updated in response to revised client-to- Web router distance information. Such revised client-to-Web router distance information may be included in the inter-Web router communication messages and is preferably determined, at least in part, from internetwork connectivity information received through an exchange of messages according to an inter-domain routing protocol. Furthermore, the tables may be updated in response to revised server load information and the updated table information transmitted to one or more of the Web routers using one or more inter-Web router communication messages.

A Web Router that receives more than one set of mapping information from its neighbor picks the set that offers the optimum distance to the information object or service identifier. When more than one neighbor offers an optimum distance to the information object or service, one of them is chosen using a rule that reduces communication overhead. A mapping for an information object identifier and a server is only accepted from a neighbor that offers the optimum distance to the Web router that is sent in the mapping.

Figure 4:
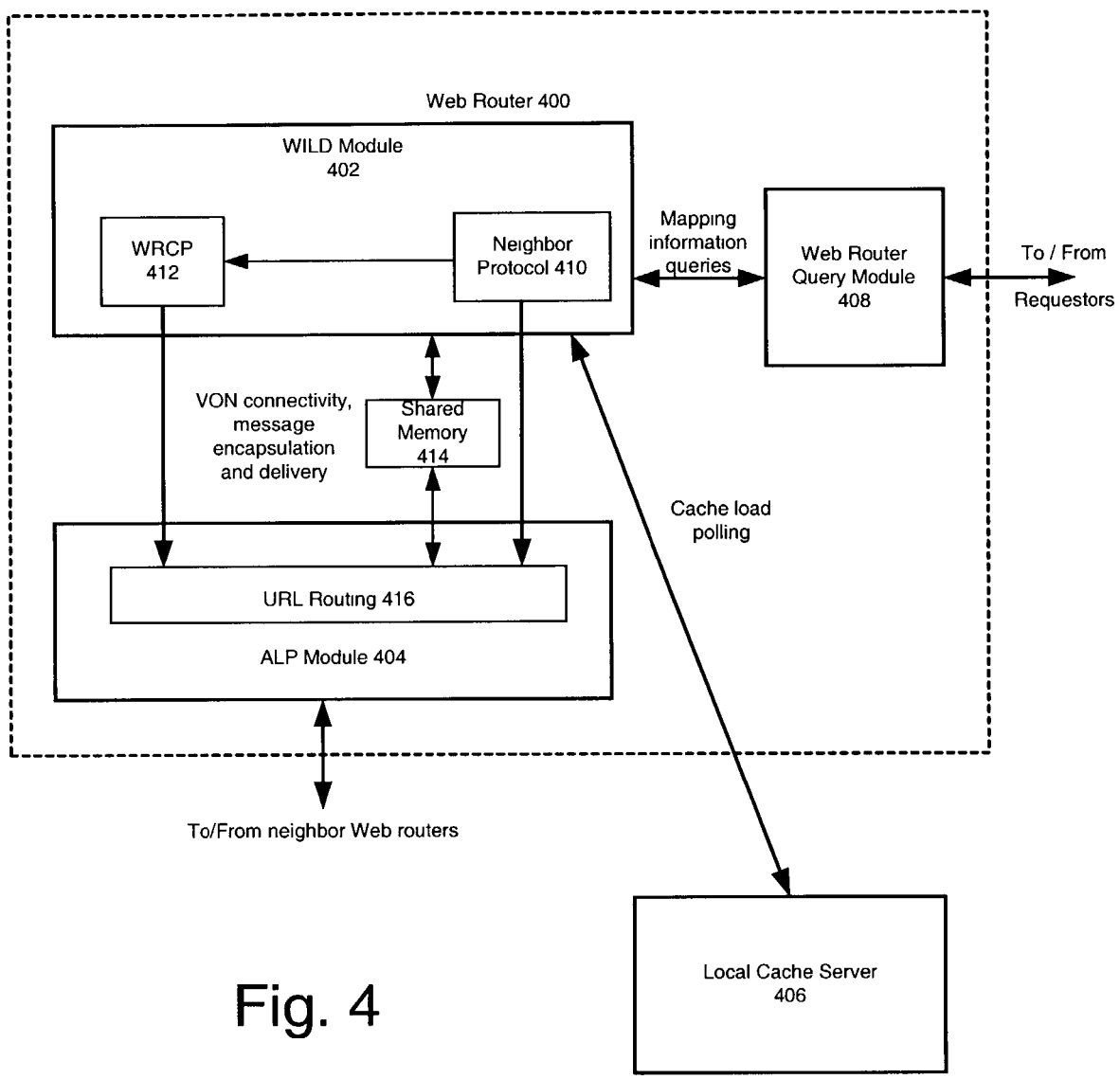
FIG. 4 illustrates functional componets of a Web router in accordance with an embodiment of the present invention.

FIG. 4 illustrates the interaction between various functional components that make up a Web router 400. The method implemented in Web routers to determine an optimum server for a given information object or service is referred to as "URL Routing" and an information object identifier or service identifier is referred to as a "URL". The Web router maps each URL provided by a requestor to the address of an information object repository that can optimally provide the associated information object. This mapping of URLs to addresses is accomplished by the collaboration among Web routers through WELD. Accordingly, the Web router contacted by the requestor can return the required addresses immediately after processing the request.

In each Web router 400, a WILD protocol module 402 uses mappings of clients (or, more generally, requestors)-to-Web routers received from other Web routers along with load information regarding any local servers 406 to produce a mapping table that lists the address of the server (i.e., information object repository) that is best suited to service requests from identified clients. The WILD protocol module 402 further uses an ALP module 404 for obtaining VON connectivity and Web router reachability information. It also uses ALP messages to encapsulate and deliver its own WILD messages to neighbor Web routers. As indicated above, other routing protocols can be used instead of ALP, provided that the protocol does not create permanent or long-term loops after link cost increases or resource failures. The ALP module 404 reports distances to the WILD module 402, so that the WILD module 402 knows about unreachable Web routers while determining the validity of different maps. The inter-communication between WILD module 402 and ALP module 404 may take place through the use of shared memory 414.

In one embodiment, various modules, including the ALP module 404, are implemented in GateD. GateD is a commercially available, modular software program that includes certain core services, a routing database and various protocol modules supporting multiple routing protocols. GateD and GateD-based products are available from NextHop Technologies, Inc. of Ann Arbor, Mich. ALP module 404 notifies the WILD protocol module 402 as distances to various Web routers and information object repositories change. When a Web router 400 receives a WILD message (i.e., a WILD message that was received encapsulated in an ALP message), it first validates the message contents, and then updates its tables based on distance. The end result is that the WILD tables at each Web router 400 converge to the optimum mappings.

The WILD protocol module 402 obtains load information from its local information object repository 406. This load information is subsequently used by the WILD protocol module 402 for generating the mappings discussed above. More particularly, the WILD module 402 periodically polls the local information object repository 406 to obtain the load information. If the information object repository 406 fails, a load of infinity is reported to the WILD module 402.

The WILD protocol module 404 also interacts with a Web router query (WRQ) module 408 in directing requestors to optimum information object repositories. The Web router 400 responds to queries from the WRQ module 408 for the nearest server, Web cache, redirector, DNS server or another Web router. A Web router may be contacted through the WRQ module 408 by a client or a server (or other information object repository) seeking to discover an optimum information object repository for one or more information objects distributed over the computer network. This scheme makes use of a neighbor protocol module 410.

For purposes of the remaining discussion, assume that each hosting site includes at least one Web router 400 configured for URL routing. Each cache (or other information object repository) establishes connectivity with only one Web router at a time. This Web router becomes the originator of updates related to that cache. Accordingly, if an information object exists on a cache server, then the local Web router becomes aware of that object using WRCP module 412.

The Web router is responsible for determining which of a number of available information object repositories should service a request for an information object or service. The Web router may also determine the information object repository that actually maintains the information object or service so requested, and initiate the process of bringing the information object or service to the information object repository that should service the request. Bringing the requested information object or service to the information object repository which it has been determined should service the request is accomplished, in one embodiment, by instructing that information object repository which will service the request to retrieve the requested information object or service from the information object repository which actually maintains the information object or service. Thereafter, upon receiving an instruction to do so, the information object repository which it has been determined should service the request contacts the information object repository that actually maintains the requested information object or service directly to request the information object or service.

Knowing which information object repository is "optimal" for a given URL requires that the Web routers be provided with distance information concerning those URLs. The specific algorithm that a Web router executes to compute the distance to the nearest server storing a copy of an information object or service depends on the routing information that the Web routers use to compute distances to other Web routers, which are co-located with the servers storing information objects and services. Recall that a Web router is informed by its local server(s) of the load in the server(s) and the information objects and services stored in the servers. Hence, a Web router knows that its distance to information objects and services stored in local server(s) is the latency incurred in obtaining those objects or services from the local servers, which is a direct function of the load in those servers.

Given that a Web router executes a routing algorithm enabling the Web router to know its distance to other Web routers, a Web router selects the optimum server storing a copy of an information object or service by comparing the local distance to the information object or service (which is the latency incurred by a local server if the object or service is stored locally or infinity if the object or service is not stored locally) with the reported matches of object identifiers to servers reported by its neighbor Web routers. The object-server match report for a given information object or service specifies the identifier of a service or information object, the server where the service or information object is stored, the Web router that is local to that server, and the distance to the server. The distance specified in the object-server match report includes explicitly or implicitly the distance from the neighbor Web router to the server specified in the report, plus the load of the server specified in the report. The Web router then chooses the match of information object to server that produces the minimum distance to the server storing the service or object.

The distance between Web routers is derived from the routing protocol that runs over the virtual overlay network. This routing protocol can be any routing protocol that avoids permanent and long-lasting loops. For instance, any one of the following routing algorithms can be run on the virtual overlay network:

(1) Diffusing update algorithm (DUAL), which is the basis for Cisco's EIGRP;
(2) Loop-Free path-finding algorithm (LPA);
(3) Link-vector algorithm (LVA);
(4) Bandwidth efficient source tree (BEST) protocol;
(5) Dynamic source tree (DST) routing protocol;
(6) Diffusing algorithm for shortest multipaths (DASM);
(7) Multipath distance vector algorithm (MDVA);
(8) Routing on-demand acyclic multipath (ROAM) protocol;
(9) Multiple-path partial-topology dissemination algorithm (MPDA);
(10) Multipath loop-free routing algorithm (MPATH);
(11) Adaptive link-state protocol (ALP);
(12) A topology broadcast protocol, such as the one implemented in the Open Shortest Path First protocol (OSPF);
(13) The path vector algorithm used as part of the Border Gateway Protocol (BGP); or
(14) A static table in a Web router specifying the next hops or paths to every other active Web router in the system.

To provide for the reporting of object-server matches to requesters, each Web router maintains a routing database consisting of a routing table, a server table, and a neighbor table. These tables do not need to be exported to the kernel and therefore their size is only constrained by the limits of the available system memory. The routing tables have sizes proportional to the number of URLs they contain, whereas the server table has a size proportional to the number of information object repositories known by the URL routing protocol. The neighbor table size will be proportional to the number of neighbors (both Web router neighbors and local information object repositories). In order to provide for a constant lookup time, a hash table data structure may be used for all three data structures.

Each URL entry in the routing table has the following fields

| URL name | Cache IP | Local |
|---|---|---|

URL name is the name assigned to the information object. CacheIP corresponds to the IP address of the optimum information object repository from which to get the associated information object. Local is a bit mask corresponding to the neighbor table. If a cache neighbor has reported a URL, then its bit is set in the bit mask.

Each entry of the server table has the following fields:

| Cache IP Address | Cache Load | Cache_SN | Web Router | Neighbor | Alp_dist | Counter |
|---|---|---|---|---|---|---|

Cache IP Address is the 32-bit IP address of the information object repository. Cache Load is the value corresponding to the load on that information object repository. This may be measured by a computer process resident at the information object repository and reported to the associated Web router using WRCP. Cache_SN is the sequence number associated with the last update regarding the information object repository (used for verification). The Web Router is the Web router that is responsible for sending updates about the associated information object repository. Neighbor stands for the neighbor Web router that offers the best path to the information object repository. Alp_dist is the distance to the Web Router obtained by a routing protocol running in the virtual overlay network. Counter is a count of the number of URLs using the identified information object repository.

Each entry of the neighbor table has the following fields:

| Neighbor Address | Link cost |
|---|---|

Neighbor address is the IP address of the neighbor (Web router or local information object repository). Link cost is the cost of the link in the case of Web router neighbors and load in case of information object repository neighbors.

The URL routing process 416 running at each Web router exchanges updates with its peer processes sitting on other Web routers. These updates are exchanged as packets (which may be encapsulated in ALP packets) that include the following header fields.

| Version Number | Cloud ID | Type | Count | Neighbor Link Cost |
|---|---|---|---|---|

Version number indicates the version of the routing protocol running on the Web router originating the message. The version number needs to be checked by the receiving Web router before processing a packet. If the version number indicates that the originating Web router is using a different version of the routing protocol than the receiving Web router, the packet is simply dropped.

It is possible that vendors that deploy URL routing may need to segment off different sections of their network. Each segment is described as a cloud. A Cloud ID is therefore a quantity that is set on initial configuration of a Web router. A Web router only accepts packets having the same Cloud ID as itself.

The Type of the update message indicates whether the update is a UE1-UE2 combination update or a UE3 kind of update. In a UE1-UE2 update, the Count keeps track of the number of information object repository entries in the message. In a UE3 update, the Count keeps track of the number of Web router updates in the message. The Neighbor Link Cost is the link cost to the neighbor Web router to which this message is being sent.

Each UE1-UE2 update has information regarding an information object repository, followed by a list of URLs corresponding to that information object repository. Therefore, if two URLs from the same information object repository are reported, an optimization can be achieved by sending the information object repository information only once and appending the list of URLs that correspond thereto as follows:

| Cache Ip Address | Load | Web Router | Alp distance to WR | URL Count |
|---|---|---|---|---|
| URL 1 | ADQ Flag | | | |
| URL 2 | ADQ Flag | | | |

Cache IP Address, Load, Web Router and ALP distance have the same meaning as in the server table. URL Count is the number of URL entries corresponding to the subject information object repository. The ADQ flag specifies whether an update message corresponds to an add message (i.e., a message indicating a URL has been added to the local cache), a delete message (i.e., a message indicating a URL has been removed from the local cache) or a query. A Web router that receives a query must return its latest routing table entry to the neighbor that sent the query. In the pseudocode described below, the command to consolidate updates ends up arranging each update in this fashion.

A UE3 update asks for all routes from a Web router. This query simply sends the Web router address that is of interest and is an efficient method to keep updated tables in the absence of neighbor tables.

URL routing module 416 tries to pick the URL entry whose sender is at the optimum distance, i.e., whose network latency to the information object repository plus the associated load is the smallest. The network latency to the actual information object repository is essentially the same as the network latency to the Web router associated therewith. The network latency to the associated Web router is obtained using a routing protocol that provides distances to Web routers, such as ALP. Therefore, there is no tree traversal involved and the complexity of URL routing is reduced to O(U.N), where U is the number of URLs and N is the number of neighbors.

Using the URL routing process a Web router responds to the following external inputs in order to maintain up-to-date matches between information object repositories and information object or service identifiers:
 (1) Adds/deletions from an associated information object repository transmitted using WRCP.
 (2) Changes in load from an associated information object repository transmitted using WRCP.
 (3) Changes in information object repository connectivity received through the neighbor protocol.
 (4) URL updates from other neighbor Web routers (e.g., received via WILD).
 (5) Changes in Web router neighbor connectivity reported by the routing protocol used to compute distances to other Web routers (e.g., ALP).
 (6) Changes in distances to other Web Routers.
 (7) URL lookup queries from WRCP.

Also using URL routing, a Web router sends the following outputs:
 (1) Response to a query sent by WRCP.
 (2) URL updates to Web router neighbors.

When a Web Router receives any of the above inputs, it takes the following actions:
 (1) If the input offers a better distance to the URL, change the routing table to use the new input and send out an add update.
 (2) If the input offers a worse distance than the present one, ignore it.
 (3) If the input causes the loss of the last path, send out a delete.
 (4) If the input causes a distance increase or causes the Web router to pick a different path, change the routing table accordingly and send out a query.

The various functional modules described above, along with the interfaces between the modules, are best presented in the following pseudocode. This includes the inter-process communications (calls) as well as the main procedures themselves. For convenience, the routing protocol used to compute distances between Web routers is assumed to be ALP; however, other routing protocols could be used instead. Furthermore, the information object repositories used to store information objects or services are referred to as caches, though this term should be understood to include all forms of information object repositories. In the pseudocode, the following variables and data structures are used:
 i: The Web router in which the algorithm is running.
 Ni: The current set of neighbors reported by ALP and Neighbor Protocol.
 URT: Shared memory URL routing table with all known URLs. Each entry has the following fields:
  url: The first 32 bits of the MD5 hash of the URL.
  p_cache: The preferred cache.
  p_port: The port used by the preferred cache.
  local: bit mask corresponding to the local caches that have the URL.
 NT: Neighbor Table with entries for each neighbor in Ni. Each entry has the following fields:
  nbr_ip: IP address of the neighbor
  nbr_port: Port for a cache neighbor
  l_cost: Cost of the link to the neighbor
 CT: Cache table for all the caches currently known by URL Routing. Each entry has the following fields:
  cache: IP address of the cache
  port: Port of the cache
  load: Load on the cache
  web_rtr: Web router associated with that cache
  nbr: Neighbor that offers the shortest path to web_rtr
  alp_dist: Alp distance to web_rtr
  counter: Number of NURT entries that point to this cache entry
 Each packet has the following header fields:
  version: Version number of the protocol
  cloud: Cloud in which the protocol is running
  l_cost: Link cost to neighbor to whom the packet is being sent
 UE1: update entry of type 1 in a packet. Each entry has the following fields:
  cache: IP address of the cache
  load: Load on the cache
  cache_sn: Sequence number associated with the last update about the cache
  web_rtr: Web router associated with the cache
  alp_dist: ALP distance to above web router
 UE2: update entry of type 2 in a packet. Each entry has the following fields:
  url: First 32 bits of the MD5 hash of the URL
  flag: Can be set to add or delete or query depending on the update UE3: update entry of type 3 in a packet. Each entry has the following fields:
   web_rtr: Web router to which distance has decreased The first set of inter-process calls to be presented are those made by ALP module 404 to the URL roulting process 416. For each procedure, a description is provided to orient the reader.

void alpUrlInit (u_int32 name);
PARAMETERS:
DESCRIPTION: This procedure is called by ALP when the routing protocol starts up. Used for initialization of data structures, in one embodiment hash table structures for the routing table and the neighbor tables are intialized.

void alpUrlCleanup (void);
PARAMETERS:
DESCRIPTION: This procedure is called by ALP when the routing protocol goes down. This procedure will free up memory and any other resources.

void urlAlpRecvUpdate(u_int32 nbrAdr, u_int8*msg, u_int32 msgLen);
PARAMETERS:

| nbrAdr | Address of neighbor that sent the message |
| msg | URL message (opaque format for ALP) |
| msgLen | Number of bytes in msg |

DESCRIPTION: This procedure is called by ALP when a URL message is received. The procedure converts the byte stream provided by ALP after receiving a packet into a data structure that can be easliy read out entry by entry void urlAlpChangeNbrState(array web_router_changes, u_int8 upDown)
PARAMETERS:

| web_rtr_changes | Array of records with the following fields: |
| web_rtr | Address of neighbor/web router |
| distance | Cost of link of neighbor/distance to web router |
| nbr | The next hop neighbor |
| upDown | Set to 1 if the link to the neighbor came up, set to 0 if the link to the neighbor was taken down |

DESCRIPTION: This module is called when the status of a link to a neighbor Web router changes. It is assumed that the first entry in the table web_rtr_changes corresponds to the neighbor Web router and all the other entries correspond to the other Web routers for which the Web router in the first entry is the chosen neighbor. Each entry in the array is a Web router and the alp distance and the next hop neighbor associated with it.

void urlAlpChangeNbrLinkValue(array web_rtr_changes[ ]);
PARAMETERS:

| web_rtr_changes | Array of records with the following fields: |
| web_rtr | Address of neighbor/Web router |
| distance | Cost of link of neighbor/distance to Web router |
| nbr | The next hop neighbor |

DESCRIPTION: This module is called when a link cost to a neighbor decreases. It is assumed that the first entry in the table web_rtr_changes corresponds to the neighbor Web router and all the other entries correspond to the other Web routers for which the Web router in the first entry is the chosen neighbor. Each entry in the array is a Web router and the alp distance and the next hop neighbor associated with it.

void urlAlpChangeDistance (array web_rtr_changes[ ]);
PARAMETERS:

| web_rtr_changes | Array of records with the following fields: |
| web_rtr | Address of neighbor/Web router |
| distance | Cost of link of neighbor/distance to Web router |
| nbr | The next hop neighbor |

DESCRIPTION: This module is called when a distance change to a destination occurs in ALP. The input is an array of Web routers with the new distances and new neighbors to them.

Next, the calls from URL routing module 416 to ALP module 404 are presented.

void urlAlpGetNewSeqNumber(AlpSeqNum * seqNum);
PARAMETERS:

| seqNum | Sequence number to be returned |

DESCRIPTION: Return a sequence number to the URL routing module.

s_int8 AlpCompareSeqNum(AlpSeqNum * sn1, AlpSeqNum * sn2);
PARAMETERS:

| sn1 | Sequence number |
| sn2 | Sequence number |

DESCRIPTION: Return −1 if sn1<sn2, 0 if sn1=sn2, 1 if sn1>sn2.

u_int8 urlAlpIsNbr(u_int32 nbrAdr);
PARAMETERS:

| nbrAdr | Address of a router running ALP |

DESCRIPTION: Returns TRUE if nbrAdr is a neighbor, FALSE otherwise.

u_int32 urlAlpGetDistance(u_int32 dstAdr);
PARAMETERS:

| dstAdr | Address of the destination |

DESCRIPTION: Returns the cost of the path to destination dstAdr. Returns ALP_INFINITY if the destination is unreachable.

u_int32 urlAlpGetNeighbor(u_int32 dstAdr);
PARAMETERS:

| dstAdr | Address of the destination |

DESCRIPTION: Returns the neighbor to destination dstAdr. Returns NULL if the destination is unreachable.
void urlAlpSendUpdate(u_int8 * msg, u_int32 msgLen);
PARAMETERS:

| | |
|---|---|
| msg | Buffer with opaque data |
| msgLen | Number of bytes in the message |

DESCRIPTION: Broadcast the URL routing message to all the neighbors.
void urlAlpSendNbrUpdate(u_int32 nbr, u_int8 * msg, u_int32 msgLen);
PARAMETERS:

| | |
|---|---|
| nbr | Neighbor Web router to which the message needs to be sent |
| msg | Buffer with opaque data |
| msgLen | Number of bytes in the message |

DESCRIPTION: Unicast the update message to one neighbor.
The following are the calls made by the WRCP mdule 412 to the URL routing module 416.
void updateURL(array tuple[ ]);
PARAMETERS:
tuple is an array where each entry has the following fields

| | |
|---|---|
| cache | IP Address of the cache from which the add/delete inidcation originates |
| port | Port of the cache from which the add/delete inidcation originates |
| upper32 | First 32 bits of the Md5 hash of the URL |
| ttl | TTL (time to live) value associated with the URL |

DESCRIPTION: This function is called by the WRCP module to inform the URL routing module that local cache objects have been added or deleted. int findURL (u_int32 * cache, u_int32 upper32);
PARAMETERS:

| | |
|---|---|
| cache | Pointer to the cache which is closest |
| port | Pointer to cache's port |
| upper32 | First 32 bits of the Md5 hash of the URL |

DESCRIPTION:This function is called by the WRCP module to obtain the best cache for a URL. Returns 0 for a correct find and non-zero for all other cases. When the function returns 0, the cache contains address of closest cache.
int changeCacheLoad(u_int32 cacheAdr, u_int16 port, u_int16 load)
PARAMETERS:

| | |
|---|---|
| cacheAdr | Address of the cache from which the load inidcation originates |
| port | Port of cache from which the load inidcation originates |
| load | Present load of the cache |

DESCRIPTION: This function is called by WRCP to inform the Web router of load changes in the cache.

Although not discussed in detail above, there are some "house keeping" routines that run on a Web server. For example, a time to live (TTL) clearing daemon is responsible for deleting table entries after expiration of an associated TTL. In this way, stale entries are not kept so that only "live" information is returned to requesting clients and servers. The call from the TTL clearing daemon to the URL routing module 416 is as folls:
void delUrlTTL(u_int32 url)
PARAMETERS:

| | |
|---|---|
| url | First 32 bits of the MD5 hash of the URL |

DESCRIPTION: This procedure is called by the TTL clearing daemon when the TTL of a URL in the database expires.
As implied by the above, a TTL database is maintained so that the TTL clearing daemon can keep track of the lives of the various URLs. Calls from the URL routing module 416 to the TTL database may be made as follows:
void addUrlTTL(u_int32 url, u_int32 ttl)
PARAMETERS:

| | |
|---|---|
| url | First 32 bits of the MD5 hash of the URL |
| ttl | Time to live value for the url |

DESCRIPTION: This function is called to add a URL and its TTL to the database.
void readUrlTTL(u_int32 url, u_int32 ttl)
PARAMETERS:

| | |
|---|---|
| url | First 32 bits of the MD5 hash of the URL |
| ttl | Time to live value for the url |

DESCRIPTION: This function is called to retrieve a TTL from the database.
The final inter-process procedure to be presented involves calls from the neighbor protocol module 410 to the URL routing module 416.
void changeCacheNeighborState (u_int32 cacheAdr, u_int16 port, u_int18 upDown, u_int16 load);
PARAMETERS:

| | |
|---|---|
| cacheAdr | Address of the cache for which the change has taken place |
| port | Port being used by the cache |
| upDown | Set to 1 if the link to the neighbor came up, set to 0 if the link to the neighbor was taken down |
| load | Load of cache when it comes up |

DESCRIPTION: This function is called by the neighbor protocol when the link to a local cache comes up or goes down.
Having thus described the inter-process procedures, pseudocode describing the main Web router procedures themselves will now be presented. The following module is called on initialization by ALP:

```
Procedure alpUrlInit( )
begin
    Initialize memory for data structures
    Clean up files used for logging
end
```

The following module is called when an indication arrives that a local cache 406 has added/deleted a number of URLs.

```
Procedure updateURL(array tuple[])
begin
    for each entry (cache, port, url, ttl, type) in tuple
        if type is ADD
            call addURL(cache, port, url, ttl)
        else
            call delURL(cache, port, url, ttl)
        consolidate outgoing update
        broadcast update to all neighbors
        delete caches with zero counters that are not neighbors
end
```

The following module is called when an indication arrives that a local cache 406 has loaded a URL.

```
Procedure addURL(u_int32 cache, u_int16 port, u_int32 url, u_int32 ttl)
begin
    if (cache, port) has not been reported by the neighbor protocol
    (not in NT)
        then
            continue
    cache_entry □entry for (cache, port) in CT
    if url does not exist in URT
        add entry (url, cache, port) to URT
        addURLTTL(url, ttl)
        mark entry corresponding to (cache, port) in URT.local
        cache_entry.counter ++
        add entry UE1 (cache, cache_entry.port, cache_entry.load,
                cache_entry.web_rtr, 0) into update
        add entry UE2 (url, add, ttl) into update
    else
        if bit corresponding to (cache, port) in URT[url].local is not set
            mark bit corresponding to (cache, port) in URT[url].local
            cache_entry2 □entry for (URT[url].p_cache,
                URT[url].p_port) in CT
            old_distance □ cache_entry2.load + cache_entry2.
            alp_dist
            if (cache_entry.load < old_distance)
                URT[url].p_cache □ cache
                URT[url].p_port □ port
                add entry UE1 (cache, cache_entry.port ,
                    cache_entry.load , cache_entry.web_rtr, 0)
                        into update
                add entry UE2 (url, add, DEF_TTL) into update
                cache_entry.counter ++
                cache_entry2.counter □□cache_entry2.counter – 1
end
```

The following module is called when the WRQ module 408 requires the closest cache to the identified URL.

```
Procedure findURL(u_int32 cache, u_int16 port, u_int32 url)
begin
    if URT[url] exists
        cache □□□URT[url].p_cache
        port □□□□URT[url].p_port
        return
    else
        return error
end
```

The following module is called when an indication arrives that the local cache 406 has deleted a URL.

```
Procedure delURL(u_int32 cache, u_int16 port, u_int32 url, u_int32 ttl)
begin
    if (cache, port) has not been reported by the neighbor protocol
    (not in NT)
        then
            continue
    if url does not exist in URT or URT[url].local bit is not set)
        continue
    cache_entry □ entry for (cache, port) in CT
    unmark bit corresponding to (cache, port) in URT[url].local
    if (URT[url].p_cache = cache)
        if (URT[url].local = 0)
            add entry UE1 (cache_entry.cache, cache_entry.port,
                cache_entry.load,cache_entry.web_rtr, 0) into
                update
            add entry UE2 (url, delete DEF_TTL) into update
            remove entry for url from URT
        else
            URT[url].p_cache □□□local cache that offers
            smallest load
                and has bit set in URT[url].local
            URT[url].p_port □□□port of local cache that offers
            smallest
                load and has bit set in URT[url].local
            cache_entry2 □□entry corresponding to (URT[url].
            p_cache,
                URT[url].p_port ) in CT
            add entry UE1(cache_entry2.cache, cache_entry2.port,
                cache_entry2.load, cache_entry2.web_rtr, 0) into
                update
            add entry UE2 (url, query, DEF_TTL) into update
            cache_entry2.counter ++
            cache_entry.counter = cache_entry.counter – 1
end
```

The following procedure is called by the TTL clearing daemon when the TTL of a URL in the database expires.

```
Procedure delUrlTTL(u_int32 url)
begin
    remove entry for url from URT
    delete cache counter corresponding to url
    delete caches with zero counters that are not neighbors
end
```

The following module is called when the status of a link to a neighbor cache changes.

```
Procedure changeCacheNeighborState(u_int32 cache, u_int16 port,
u_int8
upDown, _int16 load)
begin
    if(upDown = UP)
        add cacheAdr to NT
        create a new cache_entry in CT
        cache_entry.cache □ cache
        cache_entry.port □ port
        cache_entry.load □□□load
        cache_entry.web_rtr     □□□address of the web router
        cache_entry.nbr         □□LOCAL
        cache_entry.alp_dist    □□□( )
        cache_entry.counter     □□□( )
    else
        delete cacheAdr from NT
        cache_entry □□entry corresponding to (cache, port) in CT
        cache_entry.load □□INFINITY
        for each url in URT
            unmark bit corresponding to (cache, port) in
                URT[url].local
```

-continued

```
        if ((URT[url].p_cache, URT[url].p_port]) = (cache, port))
            if (URT[url].local = 0)
                    add entry UE1 (cache_entry.cache,
                            cache_entry.port, cache_entry.load,
                            cache_entry.web_rtr, 0) into
                            outgoing update
                    add entry UE2 (url, delete,_DEF_TTL) into
                            update
                    remove entry for url from URT
            else
                    URT[url].p_cache □□□address of □□local
                            cache that offers smallest load and
                            has bit in URT[url].local
                    URT[url].p_port □□□port of □□local cache
                            that offers smallest load and has bit
                            set in URT[url].local
                    cache_entry2 □□□entry corresponding to
                            (URT[url].p_cache,
                            URT[url].p_port) in CT
                    cache_entry2.counter ++
                    add entry UE1 (cache_entry2.cache,
                            cache_entry2.port
                            cache_entry2.load,
                            cache_entry2.web_rtr, 0) into
                            update
                    add entry UE2 (url, query, DEF_TTL) into
                            update
        delete cache entry from CT
        consolidate outgoing update
        broadcast update to all neighbors
end
```

The following module is called by WRCP module 412 when it receives an indication that the load on a neighbor cache has changed.

```
Procedure changeCacheLoad(u_int32 cache, u_int16 port, u_int16 load)
begin
        cache_entry □□entry corresponding to (cache, port) in CT
        if ((cache, port) □ Ni)
                return
        if (cache_entry.load = load)
                return
        old_load □□□cache_entry.load
        cache_entry.load □□□load
        if (old_load < load)
                for each url in URT
                        if ((URT[url].p_cache, URT[url].p_port) = (cache, port))
                                tcache_entry □□□entry in CT□□corresponding to
                                        □□local cache that has the smallest load and
                                        has bit set in URT[url].local
                                if (tcache_entry.cache □ URT[url].p_cache)
                                        URT[url].p_cache □□□tcache_entry.cache
                                        URT[url].p_port □□□tcache_entry.port
                                        tcache_entry counter ++
                                        cache_entry.counter □□cache_entry.counter
                                                − 1
                                        add entry UE1 (tcache_entry.cache,
                                                tcache_entry.port,
                                                tcache_entry.load,
                                                tcache_entry.web_rtr,0)
                                                into update
                                        add entry UE2 (url, query, DEF_TTL) into
                                                update
                                else
                                        add entry UE1 (cache_entry.cache,
                                                cache_entry.port cache_entry.load,
                                                cache_entry.web_rtr, 0) into update
                                        add entry UE2 (url, query, DEF_TTL) into
                                                update
        else /* load has decreased*/
                for each url in URT
                        if ((URT[url].p_cache, URT[url].p_port) = (cache, port))
                                add entry UE1 (cache_entry.cache,
                                        cache_entry.port, cache_entry.load,
                                        cache_entry.web_rtr, 0) into update
                                add entry UE2 (url, add, DEF_TTL) into update
                        else if (URT[url].local has a bit set for (cache, port))
                                cache_entry2 □□entry corresponding to
                                        URT[url].p_cache ,URT[url].p_port) in CT
                                old_distance □□□cache_entry2.web_rtr +
                                        cache_entry2.load
                                if (old_distance > load)
                                        URT[url].p_cache □□□cache
                                        URT[url].p_port □□□port
                                        cache_entry2.counter
                                                □□□cache_entry2.counter − 1
                                        cache_entry.counter
                                                □□□cache_entry.counter ++
                                        add entry UE1 (cache_entry.cache,
                                                cache_entry.port, cache_entry.load,
                                                cache_entry.web_rtr, 0) into update
                                        add entry UE2 (url, add, DEF_TTL) into
                                                update
        consolidate outgoing update
        broadcast update to all neighbors
        delete caches with zero counters that are not neighbors
end
```

The following module is called when the status of a link to a neighbor Web router changes. It is assumed that the first entry in the table web_rtr_changes corresponds to the neighbor Web router and all the other entries correspond to the other Web routers for which the Web router in the first entry is the chosen neighbor. Each entry in the array is a Web router and the alp distance and the next hop neighbor associated with it.

```
Procedure urlAlpChangeNbrState(array web_router_changes, upDown)
begin
        if (upDown = UP)
                add (web_router_changes.web_rtr[0], l_cost) to NT
                for each entry in web_router_changes
                        add entry UE3(web_router_changes[i]) into web router
                                query
                consolidate update and send update
                        toweb_router_changes[0].web_rtr
        else
                if (web_rtr_changes[0].web_rtr □ NT)
                        return
                delete entry for nbr from NT
                urlAlpChangeDistance(web_rtr_changes);
end
```

The following module is called when a link cost to a neighbor changes. It is assumed that the first entry in the table web_rtr_changes corresponds to the neighbor Web router and all the other entries correspond to the other Web routers for which the Web router in the first entry is the chosen neighbor. Each entry in the array is a Web router and the alp distance and the next hop neighbor associated with it.

```
Procedure urlAlpChangeNbrLinkValue( array web_rtr_changes[]);
begin
        if (web_rtr_changes[0].web_rtr □ NT)
                return
        nbr_entry □□□entry corresponding to web_rtr_changes[0].
                web_rtr in NT
        if (nbr_entry.l_cost > web_rtr_changes[0].distance)
                for each entry in web_router_changes
                        add entry UE3(web_router_changes[i]) into web router
                                query
```

```
        consolidate update and send update to web_router_changes
            [0].web_rtr
        nbr_entry.l_cost □□□web_rtr_changes[0].distance
    urlAlpChangeDistance( web_rtr_changes);
end
```

The following module is called when a distance change to a destination occurs in ALP. The input is an array of Web routers with the new distances and new neighbors to them.

```
Procedure urlAlpChangeDistance( array web_rtr_changes[])
begin
    for each entry in web_rtr_changes
        for each cache_entry in CT
            if (cache_entry.web_rtr = web_rtr_changes[i].web_rtr)
                if (cache_entry.alp_dist > web_rtr_changes[i].
                distance)
                    cache_entry.alp_dist □□web_rtr_changes[i].
                        distance
                    for each url in URT
                        if ((URT[url].p_cache, URT[url].p_port) =
                        (cache_entry.cache, cache_entry.port))
                            add entry UE1 (cache_entry.cache,
                                cache_entry.port,
                                cache_entry.load,
                                cache_entry.web_rtr,
                                cache_entry.alp_dist ) into
                                update
                            add entry UE2(url, add,
                                DEF_TTL) into update
                else if (cache_entry.alp_dist <web_rtr_changes[i].
                distance)
                    cache_entry.alp_dist □□□web_rtr_changes[i].
                        distance
                    current_distance □□□cache_entry.alp_dist +
                    cache_
                        entry.load
                    for each url in URT
                        if ((URT[url].p_cache, URT[url].p_port) =
                        (cache_entry.cache, cache_entry.port))
                            closest_local_cache □□□□local cache
                            that
                            offers smallest load and has bit set in
                            URT[url].local
                            if (closest_local_cache = null)
                                local_distance □□ INFINITY
                            else
                                local_distance □□□load of the
                                closest_local_cache
                            if (local_distance and current_distance
                            have infinite values)
                                cache_entry.counter
                                    □cache_entry.counter – 1
                                add entry UE1 (cache_entry.cache,
                                    cache_entry.port,
                                    cache_entry.load,
                                    cache_entry.web_rtr,
                                    cache_entry.alp_dist ) into
                                    update
                                add entry UE2 (url, delete,
                                    DEF_TTL) into update
                                remove url from URT
                            else
                                if (local_distance <
                                current_distance)
                                    URT[url].p_cache
                                        □□□address of
                                        closest_local_cache
                                    URT[url].p_port □□□port□□of
                                        closest_local_cache
                                    cache_entry2 □□□cache
                                        entry corresponding
                                        to closest_
                                        local_cache in CT
                                        cache_entry2.counter++
                                        cache_entry.counter
                                            □cache_entry.
                                            counter – 1
                                        add entry UE1
                                            (cache_entry2.
                                            cache, cache_entry
                                            2.port, cache_entry
                                            2.load, cache_entry
                                            2.web_rtr,
                                            cache_entry
                                            2.alp_dist into
                                            update
                                        add entry UE2 (url, query,
                                            DEF_TTL) into
                                            update
                                else
                                    add entry UE1 (cache_entry.cache,
                                        cache_entry.port,
                                        cache_entry.load,
                                        cache_entry.web_rtr,
                                        cache_entry.alp_dist )
                                        into update
                                    add entry UE2 (url,query,
                                        DEF_TTL) into update
            else /* distance remained the same */
                if (cache_entry.nbr □ web_rtr_changes[i].nbr)
                    for each url in URT
                        if ((URT[url].p_cache,
                        URT[url].p_port) =
                        (cache_entry.cache,
                        cache_entry.port))
                            add entry UE1
                                (cache_entry.cache,
                                cache_entry.port,
                                cache_entry.load,
                                cache_entry.web_
                                rtr, cache_entry
                                .alp_dist)
                                into update
                            add entry UE2 (url, add,
                                DEF_TTL) into
                                update
            /* neighbor changed*/
            if (cache_entry.nbr □ web_rtr_changes[i].nbr)
                cache_entry.nbr □ web_rtr_changes[i].nbr
                add entry UE3(cache_entry.web_rtr) into web
                    router query and send it to cache_entry.nbr
    consolidate update and broadcast it to all neighbors
    remove all non-neighbor caches with counter = 0
end
```

The following module is called when an update packet arrives from a neighbor Web router.

```
Procedure urlAlpRecvUpdate(nbr, update)
begin
    if version number and cloud id's match
        if nbr is in NT
            get linkcost from update
            if packettype is REGULAR_UPDATE
                call urlProcessUpdate( nbr, linkcost, update)
            else
                call urlProcessWebRouterQuery(nbr, linkcost, update)
end
```

The following module is called when a Web router query arrives from a neighbor Web router.

```
Procedure urlProcessWebRouterQuery(nbr, linkcost, update)
begin
    for each rtr in the update
        for each url in URTcache_entry □entry corresponding to
        (URT[url].p_cache,URT[url].p_port) in CT
            if (cache_entry.web_rtr = rtr)
                call getUrlTTL(url, ttl)
                add entry UE1 (cache_entry.cache, cache_entry.port,
```

```
            cache_entry.load, cache_entry.web_rtr,
            cache_entry.alp_dist ) into update
        add entry UE2 (url, add, ttl) into update
end
```

The following module is called when a regular update packet arrives from a neighbor Web router.

```
Procedure urlProcessUpdate(nbr, linkcost, update)
begin
    i = -1
    while (i < number of entries in update packet)
        i ++
        if update_entry is of type UE1
            if update_entry.web_rtr is myself and update_entry.cache is not in
            Niadd entry UE1(update_entry.cache, update_entry.port, INFINITY,
            update_entry.web_rtr, 0) to outgoing update
                for each UE2 entry
                    i++
                    url □□□update_entry.url
                    if there is an entry for url in URT
                    cache_entry □□□entry corresponding to
                    (URT[url].p_cache, URT[url].p_port) in CT
                        add entry UE1 (cache_entry.cache,
                        cache_entry.port, cache_entry.load,
                        cache_entry.web.rtr, cache_entry.alp_dist )
                        into update
                        add entry UE2 (url, add, DEF_TTL) into
                        update
                    continue
            if update_entry.web_rtr doesn't exist or has an infinite distance in
            ALP tables
                read all entries besides query entries till the next UE1 and
                increment i as many times as the number of UE2 entries
                read
            continue
            cache_entry □ entry corresponding to update_entry.cache in CT
            if cache_entry exists
                if (cache_entry.nbr = nbr)
                    if (cache_entry.load < update_entry.load)
                        typechange □□□INCREASE
                    else if (cache_entry.load > update_entry.load)
                        typechange □□DECREASE
                    else
                        typechange □□SAME
                    cache_entry.load □□□□update_entry.load
                    if there are no following UE1 entries
                        call processCacheChange(cache_entry,
                        typechange)
                /* from incorrect neighbor */
                else
                    if (cache_entry.load □ update_entry.load) and
                    (cache_entry.alp_dist < update_entry.alp_dist )
                        add entry UE1 (cache_entry.cache,
                        cache_entry.port, cache_entry.load,
                        cache_entry.web_rtr,
                        cache_entry.alp_dist) into
                        outgoing update
                        for each UE2 entry
                            i++
                            url □□□update_entry.url
                            if there is no entry for url in URT
                                if (update_entry flag □ DEL)
                                and (cache_entry.alp_dist <
                                update_entry.alp_dist)
                                    add entry UE1
                                    (cache_entry.cache,
                                    cache_entry.port,
                                    cache_entry.load,
                                    cache_entry.web_rt
                                    r, cache_entry.
                                    alp_dist) into
                                    outgoing update
```

```
                    add entry UE2 (url,
                        del, DEF_TTL) into
                        update
                    continue
                senderDistance □□update_entry.alp_
                    dist + update_entry.load
                cache_entry2 □ entry in CT
                    corresponding to
                    (URT[url].p_cache,
                    URT[url].p_port)
                currentDistance □□□cache_entry.alp
                    _dist + cache_entry.load
                if (senderDistance >
                    currentDistance + linkcost)
                    add entry UE1
                        (cache_entry.cache,
                        cache_entry.port,
                        cache_entry.load,
                        cache_entry.web_rt
                        r, cache_entry
                        .alp_dist) into
                        outgoing update
                    add entry UE2 (url, add,
                        DEF_TTL) into
                        update
            continue
/*cache entry does not exist*/
else
    correct_nbr □□□urlAlpGetNeighbor(update_entry.web_rtr)
    if (correct_nbr = nbr)
        if (update_entry.load = INFINITY)
            for each UE2 entry
                i++
                url □□□update_entry.url
                if there is an entry for url in URT
                    cache_entry2 □□□entry
                    corresponding to
                    (URT[url].p_cache,
                    URT[url].p_port) in CT
                        add entry UE1
                        (cache_entry2
                        .cache, cache_entry
                        2.port, cache_entry
                        2.load, cache_entry
                        2.web_rtr, cache_
                        entry2.alp_dist )
                        into update
                        add entry UE2 (url,
                        add, DEF_TTL)
                        into update
                        continue
        else
            create a new cache_entry in CT
            cache_entry.cache □ update_entry.cache
            cache_entry.port □ update_entry.port
            cache_entry.load □□□update_entry.load
            cache_entry.web_rtr
                □□□update_entry.web_rtr
            cache_entry.nbr□□□nbr
            cache_entry.alp_dist       □□□
            urlAlpGetDistance(update_entry.web_rtr)
            cache_entry.counter       □□□0
            typechange □□□DECREASE
/* from incorrect neighbor */
else
    for each UE2 entry
        i++
        url □□□update_entry.url
        if there is no entry for url in URT
            continue
        senderDistance □□□update_entry.alp_dist +
                update_entry.load
        cache_entry2 □ entry in CT corresponding to
                (URT[url].p_cache,
                URT[url].p_port)
        currentDistance □□□cache_entry.alp_dist +
                cache_entry.load
        if (senderDistance > currentDistance +
                linkcost)
```

-continued

```
                    add entry UE1 (cache_entry.cache,
                            cache_entry.port,
                            cache_entry.load,
                            cache_entry.web_rtr,
                            cache_entry.alp_dist) into
                            outgoing update
                    add entry UE2 (url, add, DEF_TTL)
                            into update
            continue
    else if entry is of type UE2
        i++
        url ←← update_entry.url
entry_distance ←← cache_entry.alp_dist+ cache_entry.load
if url exists in URT
        cache_entry2 ←←← entry corresponding to URT[url].p_cache,
                    URT[url].p_port in CT
        current_distance ←←← cache_entry2.alp_dist + cache_entry2.load
        closest_local_cache ←←← local cache that offers smallest
                    load and has bit set in URT[url].local
        if there is no closest_local_cache
                local_distance ←←← INFINITY
        else
                local_distance ←←← load of the closest_local_cache
else
        current_distance ←←← INFINITY
        local_distance ←← INFINITY
if (update_entry.flag = add or update_entry.flag = query)
            if (URT[entry.url] does not exist)
                URT[url].p_cache ←←← update_entry.cache
                URT[url].p_port ← update_entry.port
                call addUrlTTL(update_entry.ttl)
                add entry UE1 (cache_entry.cache,
                        cache_entry.port, cache_entry.load,
                        cache_entry.web_rtr, cache_entry.alp_dist)
                        into outgoing update
                add entry UE2 (url, add, update_entry.ttl) into
                        update
                cache_entry.counter++
                continue
            else
                if (cache_entry.nbr = cache_entry2.nbr)
                if (cache_entry.cache=cache_entry2.cache)
                    if (typechange = INCREASE)
                        if (local_distance <
                        current_distance)
                            URT[url].p_cache
                            ←← closet_local_
                            cache.cache
                            URT[url].p_port ←
                            closest_local_cache
                                .port
                            cache_entry3
                                ←←← cache
                                entry
                                correspond-
                                ing to
                                closest_
                                local_cache
                                in CT
                            cache_entry3.
                                counter++
                            cache_entry2.
                                counter
                            ← cache_entry2.
                                counter − 1
                            add entry UE1
                    (cache_entry3.cache,
                    cache_entry3.port,
                    cache_entry3.load
                    cache_entry3.web_rtr, 0)
                    into update
                            add entry UE2 (url,
                    query, DEF_TTL ) into
                    update
                            continue
                        else
                            add entry UE1
                    (cache_entry2.cache,
                    cache_entry2.port,
```

-continued

```
                    cache_entry2.load,
                    cache_entry2.web_rtr,
                    cache_entry2.alp_dist)
                    into update
                        add entry UE2 (url,query,
            DEF_TTL) into update
                        continue
            if (typechange = DECREASE)
                    add entry UE1
            cache_entry2.cache,
                        cache_entry2.port,
                        cache_entry2.load,
                        cache_entry2.web_rtr,
                        cache_entry2.alp_dist) into
                            update
                    add entry UE2 (url,add, DEF_TTL)
                        into update
                    continue
        else /* old neighbor switched caches */
            if (local_distance < entry_distance)
                    URT[url].p_cache □□□
                closest_local_cache.cache
                    URT[url].p_port □□□
                    closest_local_cach.port
                    cache_entry3 □□□cache entry
                    corresponding to
                    closest_local_cache in CT
                    cache_entry3.counter++
                    cache_entry2.counter □□□
                    cache_entry2.counter − 1
                    add entry UE1 (cache_entry3.cache,
                        cache_entry3.port,
                        cache_entry3.load,
                        cache_entry3.web_rtr, 0)
                        into update
                    add entry UE2 (url, query,
                        DEF_TTL ) into update
                    continue
            else
                    URT[url].p_cache □□□
                        cache_entry.cache
                    URT[url].p_port □□□
                        cache_entry.port
                    cache_entry.counter ++
                    cache_entry2.counter □□□
                    cache_entry2.counter − 1
                    add entry UE1 (cache_entry.cache,
                        cache_entry.port,
                        cache_entry.load,
                        cache_entry.web_rtr,
                        cache_entry.alp_dist)
                        into update
                    add entry UE2 (url,query,
                        DEF_TTL) into update
                    continue
                else /*update from other than current
                            nbr*/
                    if (entry_distance < current_distance)
                            URT[url].p_cache □□
                                cache_entry.cache□
                            URT[url].p_port □□
                                □cache_entry.port
                        cache_entry.counter ++
                            cache_entry2.counter □□□
                            cache_entry2.counter − 1
                            add entry UE1 (cache_entry.cache,
                            cache_entry.port,
                            cache_entry.load,
                            cache_entry.web_rtr,
                            cache_entry.alp_dist)
                            into update
                            add entry UE2(url, add, DEF_TTL)
                                into update
                        else
                            if (entry.flag = query)
                                sender_distance □□□
                            update_entry.alp_dist+
                                cache_entry.load
                                if ( sender_distance >
```

```
                    current_distance +
                    linkcost)
                        add entry UE1
                        (cache_entry2.cache,
                    cache_entry 2.port, cache_
                    entry2.load, cache_entry2.web_rtr,
                    cache_entry2. alp_dist) into update
                        add entry UE2
                        (url,add, DEF_TTL) into update
                        continue
            else /* update_entry.flag = del */
                if url not in URT
                    continue
                if (cache_entry.nbr = cache_entry2.nbr)
                    if (local_distance is finite)
                        URT[url].p_cache □□□closest_local_cache.
                            cache
                        URT[url].p_port □□□closest_local_cach.port
                            cache_entry3 □□□cache entry
                            corresponding to
                            closest_local_cache in CT
                        cache_entry3.counter++
                        cache_entry2.counter
                            □□□cache_entry2.counter – 1
                            add entry UE1 (cache_entry3.cache,
                                cache_entry3.port,
                                cache_entry3.load,
                                cache_entry3.web_rtr) into update
                            add entry UE2 (url, query, DEF_TTL) into
                                update
                    else
                        cache_entry2.counter
                            □□cache_entry2.counter – 1
                        remove entry corresponding to url from
                            URT
                        add entry UE1 (cache_entry2.cache,
                            cache_entry2.port,
                            cache_entry2.load,
                            cache_entry2.web_rtr) into update
                        add entry UE2(url, del, DEF_TTL) into
                            update
                else
                    add entry UE1 (cache_entry2.cache,
                        cache_entry2.port, cache_entry2.load,
                        cache_entry2.web_rtr) into update
                    add entry UE2(url, add, DEF_TTL) into update
                continue
    consolidate update
    send update to all neighbors
    remove all non-neighbor caches with counter = 0 in CT
end
```

The following module is called when a single cache update arrives.

```
Procedure processCacheChange(cache_entry, typechange)
begin
    if (typechange = INCREASE)
        entry_distance □□□cach_entry.alp_dist + cache_entry.load
        for each url in URT
            if (URT[url].p_cache = cache_entry.cache)
                closest_local_cache □□□local cache that offers
                    smallest
                    load and has bit set in URT[url].local
                if there is no closest_local_cache
                    local_distance □□□INFINITY
                else
                    local_distance □□□load of the closest_local_cache
                if (local_distance and entry_distance = INFINITY)
                    cache_entry.counter □□□cache_entry.
                        counter – 1
                    remove entry corresponding to url from URT
                    add entry UE1 (cache_entry2.cache,
                        cache_entry2.port, cache_entry2.load,
                        cache_entry2.web_rtr) into update
                    add entry UE2(url, del, DEF_TTL) into update
                    continue
                if (local_distance < entry_distance)
                    URT[url].p_cache □□□closest_local_cache.
                        cache
                    URT[url].p_port □□□closest_local_cach.port
                    cache_entry3 □□□cache entry corresponding to
                        closest_local_cache in CT
                    cache_entry3.counter++
                    cache_entry.counter □□□cache_entry.
                        counter – 1
                    add entry UE1 (cache_entry3.cache,
                        cache_entry3.port, cache_entry3.load,
                        cache_entry3.web_rtr) into update
                    add entry UE2 (url, query, DEF_TTL) into
                        update
                    continue
                else
```

```
                add entry UE1 (cache_entry.cache,
                    cache_entry.port, cache_entry.load,
                    cache_entry.web_rtr, cache_entry.alp_dist) into
                    update
                add entry UE2 (url,query, DEF_TTL) into update
        else
            for each url in URT
                if (URT[url].p_cache = cache_entry.cache)
                    add entry UE1 (cache_entry.cache,
                        cache_entry.port, cache_entry.load,
                        cache_entry.web_rtr) into update
                    add entry UE2(url, add, DEF_TTL) into update
end
```

Thus a scheme for enabling the discovery of the caches and servers storing information objects distributed over computer networks, which can be implemented in hardware and/or software, has been described. It should be appreciated that some embodiments of the present invention make use of so-called network-layer URL (NURL) routing. This routing technique involves mapping requested URLs to unicast addresses, which are then used as an anycast IP address (i.e., a unicast address advertised by multiple, physically distinct points in an internet). See, e.g., Craig Partridge, Trevor Mendez, and Walter Milliken, "Host any casting service", RFC 1546, November 1993. A system and method for using uniform resource locators (URLs) to map application layer content names to network layer anycast addresses, the aforementioned mapping, is disclosed in commonly-owned U.S. Provisional Application No. 60/200,511, entitled "System and Method for Using URLs to Map Application Layer Content Names to Network Layer Anycast Addresses", filed Apr. 28, 2000 by J. J. Garcia-Luna-Aceves and Bradley R. Smith, now replaced by co-pending and commonly-owned U.S. patent application Ser. No. 09/844,857, entitled "System and Method for Using Uniform Resource Locators to Map Application Layer Content Names to Network Layer Anycast Addresses", filed Apr. 26, 2001 by J. J. Garcia-Luna-Aceves and Bradley R. Smith, the complete disclosures of which is hereby incorporated by reference. Furthermore, a system and method for using network layer URL routing to locate the closest server carrying specific content (network-level routing of URLs) is disclosed in commonly-owned U.S. Provisional Application No. 60/200,402, entitled "System and Method for Using Network Layer URL Routing to Locate the Closest Server Carrying Specific Content (NURL Routing)", filed Apr. 28, 2000 by J. J. Garcia-Luna-Aceves and Bradley R. Smith, now replaced by co-pending and commonly-owned U.S. patent application Ser. No. 09/844,856, entitled "System and Method for Using Network Layer Uniform Resource Locator Routing to Locate the Closest Server Carrying Specific Content", filed Apr. 26, 2001 by J. J. Garcia-Luna-Aceves and Bradley R. Smith, the complete disclosures of which is hereby incorporated by reference.

With the route to the anycast cache server existing in the network infrastructure, a cache server processing a cache miss would like to transfer the content from the URL IP address. In an exemplary embodiment, in such a situation, the present invention resolves the anycast address to the server's real unicast address (which, by definition, uniquely identifies that server in the internet) before starting the download. In an exemplary embodiment, this is done by using an anycast address resolution protocol (AARP), which is disclosed in commonly-owned U.S. Provisional Application No. 60/200, 403, entitled "System and Method for Resolving Network Layer Anycast Addresses to Network Layer Unicast Addresses (AARP)", filed Apr. 28, 2000 by J. J. Garcia-Luna-Aceves and Bradley R. Smith, now replaced by co-pending and commonly-owned U.S. patent application Ser. No. 09/844,759, entitled "System and Method for Resolving Network Layer Anycast Addresses to Network Layer Unicast Addresses", filed Apr. 26, 2001 by J. J. Garcia-Luna-Aceves and Bradley R. Smith, the complete disclosures of which is hereby incorporated by reference.

Thus, although the foregoing description and accompanying figures discuss and illustrate specific embodiments, the present invention is to be measured only in terms of the claims that follow, and their equivalents.

What is claimed is:

1. A method, comprising:
    returning, in response to a request from a client, an address of a first server that should service a second server's request for an information object based on the second server receiving the client's request of the information object that is not located at the second server, the address of the first server being selected according to specified performance metrics, wherein the specified performance metrics comprise average processing delays at the first server, average delay from the first server to the second server, reliability of a path from the first server to the second server, and available bandwidth in said path from the first server to the second server;
    referring the second server's request for the information object to a first Web router; and
    configuring the first Web router to create a map that associates an identifier of the information object with the address of the first server according to other mappings generated by other Web routers and forwarded to the first Web router, wherein the other mappings generated by the other Web routers are forwarded to the first Web router as inter-Web router communication messages passed between the Web routers using a Web Information Locator by Distance (WILD) protocol.

2. The method of claim 1 wherein the specified performance metrics comprises average delay from the first server to the second server, average processing delays at the first server, reliability of a path from the first server to the second server, available bandwidth in said path, and loads on the first server.

3. The method of claim 2 wherein the first server is an optimum server for servicing the second server's request.

4. The method of claim 3 wherein the first server is the optimum server, because the first server offers a lowest response time in delivering the information object, according to the specified performance metrics.

5. The method of claim 1 wherein upon receipt of an instruction to do so, the first server contacts an information object repository determined to store the information object.

6. The method of claim 1 wherein the first server stores a copy of the information object.

7. The method of claim 1 wherein the first server and the second server are coupled together through a virtual network.

8. The method of claim 1 wherein the map is generated by the first Web router according to the specified performance metrics, which comprise one or more of average delay from the first server to the second server, average processing delays at the first server, reliability of a path from the first server to the second server, available bandwidth in said path, and loads on the first server.

9. The method of claim 1 wherein one or more the communication messages passed between the Web routers further report an associated address of one of the other Web routers co-located with an information object repository that contains the information object.

10. The method of claim 1 wherein the other mappings specify optional associations of information object identifiers to information object repository addresses.

11. The method of claim 1 wherein the map is based on distance information obtained using a routing protocol that provides accurate distances from one Web router to another, the distance information being based on one or more of the specified performance metrics.

12. The method of claim 11 wherein the routing protocol is at least one of: a diffusing update algorithm (DUAL); a loop-free path-finding algorithm (LPA); a link-vector algorithm (LVA); a bandwidth efficient source tree (BEST) protocol; a dynamic source tree (DST) routing protocol; a diffusing algorithm for shortest multipaths (DASM); a multipath distance vector algorithm (MDVA); a routing on-demand acyclic multipath (ROAM) protocol; a multiple-path partial-topology dissemination algorithm (MPDA); a multipath loop-free routing algorithm (MPATH); an adaptive link-state protocol (ALP); a topology broadcast protocol; a path vector algorithm used as part of the Border Gateway Protocol (BGP); or a static table in the first Web router specifying the next hops or paths to one or more other active Web routers.

13. The method of claim 1 wherein the first Web router executes a communication protocol with which it determines: addresses of other Web routers participating in a virtual overlay network with the first Web router; and optimum distances to each Web router in the virtual overlay network.

14. The method of claim 13 wherein the first Web router further determines neighbor Web routers that offer the optimum distances to each Web router in the virtual overlay network.

15. The method of claim 13 wherein the first Web router updates the map according to messages received from other Web routers in the virtual overlay network.

16. The method of claim 15 wherein the map is implemented as one or more tables stored in a computer readable medium.

17. A communication system, comprising:
one or more messages passed between Web routers over a Web information locator by distance (WILD) protocol, used for inter-Web router communication, said messages including information which allows said web routers to dynamically update mappings of information objects to server addresses including an address of a first server that should service a second server's request for an information object in response to the second server receiving a client requestor's request for an information object that is not located at the second server based on specified performance metrics, wherein the specified performance metrics comprise an average processing delay at the first server, average delay from the first server to the second server, reliability of a path from the first server to the second server, and available bandwidth in said path from the first server to the second server; and
a first web router, comprising a general purpose computer, for receiving the second server's request for the information object, wherein the first web router is configured to create a map that associates an identifier of the information object with the address of the first server according to other mappings generated by other web routers and forwarded to the first web router, wherein the other mappings generated by the other Web routers are forwarded to the first Web router as inter web router communication messages passed between the web routers using a Web information locator by distance (WILD) protocol.

18. The communication system of claim 17 wherein the mappings are optimal mappings of the information objects to the server addresses.

19. The communication system of claim 18 wherein the specified performance metrics comprises average delay from a server to another, an average processing delay at a server, reliability of a path from a server to another, available bandwidth in such a path, and loads on a server.

20. The communication system of claim 18 wherein said messages report updated distances from said server addresses to another information object, said distances being based on said specified performance metrics.

21. The communication system of claim 20 wherein said messages further report, for each updated distance, an associated server.

22. The communication system of claim 21 wherein said messages further report, for each updated distance, an associated address of a first Web router co-located with a first server that is a subject of the message.

23. The communication system of claim 17. wherein Web routers dynamically update mappings in response to one or more of the following inputs: addition/deletion messages from an associated information object repository, changes in load messages from the associated information object repository, changes in information object repository connectivity information, URL updates from neighbor Web routers, changes in Web router neighbor connectivity information, changes in distances to other Web Routers, and URL lookup queries.

24. The communication system of claim 23 wherein in response to one or more of the inputs, Web routers take one or more of the following actions; if an input offers a better distance to a URL than is currently maintained, change a corresponding routing table entry accordingly and transmit an add message; if an input offers a worse distance than a present routing table entry, ignore that input; if an input causes a loss of a last path, transmit a delete message; and if an input causes a distance increase, change a corresponding routing table entry accordingly and transmit a query.

25. A method, comprising
mapping an address of a requesting server seeking an information object to an address of an information object repository that has a best distance to the requesting server based on the requesting server receiving a requestor' s request of the information object that is not located at the requesting server according to specified performance metrics, wherein the specified performance metrics comprise average processing delays at the requesting server, average delay from one information object repository to another within a network, reliability of a path from one information object repository to another, and available bandwidth in said path; and
referring the requesting server's request for the information object to a first Web router; and
configuring the first Web router to create a map that associates an identifier of the information object with the address of the information object repository according to other mappings generated by other Web routers and forwarded to the first Web router, wherein the other mappings generated by the other Web routers are forwarded to the first Web router as inter-Web router communication messages passed between the Web routers using a Web Information Locator by Distance (WILD) protocol.

26. The method of claim 25 wherein distance information between information object repositories is computed according to a shortest-path first algorithm.

27. The method of claim 25, further comprising verifying mapping information between the information object and the requesting server by only trusting a neighbor node of a communication network that offers a shortest path to the requesting server.

28. The method of claim 27 wherein in the case of two or more equal distances, that mapping information which is received is adopted.

* * * * *